US 6,564,185 B1

(12) United States Patent
Miyazawa et al.

(10) Patent No.: US 6,564,185 B1
(45) Date of Patent: May 13, 2003

(54) CONTINUOUS SPEECH RECOGNITION METHOD AND PROGRAM MEDIUM WITH ALTERNATIVE CHOICE SELECTION TO CONFIRM INDIVIDUAL WORDS

(75) Inventors: Yasunaga Miyazawa, Okaya (JP); Mitsuhiro Inazumi, Shiojira (JP); Hiroshi Hasegawa, Chino (JP); Masahisa Ikejiri, Fuchu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/370,982

(22) Filed: Aug. 10, 1999

(30) Foreign Application Priority Data

Sep. 8, 1998 (JP) .............................. 10-254420

(51) Int. Cl.[7] .............................................. G10L 15/22
(52) U.S. Cl. ........................................ 704/251; 704/235
(58) Field of Search ................................ 704/235, 251, 704/271, 275

(56) References Cited

U.S. PATENT DOCUMENTS

| 4,870,686 | A | * | 9/1989 | Gerson et al. ............... 704/234 |
| 5,027,406 | A | * | 6/1991 | Roberts et al. ............. 704/244 |
| 5,428,707 | A | * | 6/1995 | Gould et al. ................ 704/231 |
| 5,774,841 | A | * | 6/1998 | Salazar et al. ............. 704/225 |
| 5,794,205 | A | * | 8/1998 | Walters et al. ............. 704/275 |
| 6,347,296 | B1 | * | 2/2002 | Friedland ................... 704/231 |

FOREIGN PATENT DOCUMENTS

| JP | 57-150895 | 9/1982 |
| JP | 58-130394 | 8/1983 |
| JP | 58-186836 | 10/1983 |
| JP | 59-62900 | 4/1984 |
| JP | 61-184683 | 8/1986 |
| JP | 63-11696 | 3/1988 |
| JP | 4-134397 | 5/1992 |
| JP | 5-52518 | 8/1993 |
| JP | 7-49697 | 2/1995 |
| JP | 7-295784 | 11/1995 |
| JP | 11-133993 | 5/1999 |

* cited by examiner

Primary Examiner—Marsha D. Banks-Harold
Assistant Examiner—Donald L. Storm
(74) Attorney, Agent, or Firm—Oliff & Berridge PLC

(57) ABSTRACT

The invention relates to a method and apparatus for recognition processing of continuous words of a group which is structured by a plurality of words such that a recognition result of all of the words which structures the continuous words is effectively and accurately confirmed. All of the continuous words which have been input are recognition processed, the recognition result of all of the continuous words is output, a response from a speaker showing an affirmative/negative recognition result is input and recognition processed. If affirmative is determined, the recognition result at that time is confirmed for all of the continuous words. If negative is determined, for each word from a first to an nth (third in this case) which structures continuous words, the content showing affirmative/negative from the speaker is recognized, affirmative or negative is determined, and the recognition result at that time is confirmed as a recognition processing target word.

7 Claims, 11 Drawing Sheets

CONTINUOUS SPEECH RECOGNITION METHOD AND PROGRAM MEDIUM WITH ALTERNATIVE CHOICE SELECTION TO CONFIRM INDIVIDUAL WORDS

BACKGROUND OF THE INVENTION

1. Field of Invention

This invention relates to a continuous word recognition method used in a speech recognition device, and also to a recording medium on which is recorded a continuous word recognition processing program used in a speech recognition device, in which continuous words which are structured by a plurality of words and which are continuously spoken with a little interval between each words are input, these continuous words are recognition processed and the recognition result is output.

2. Description of Related Art

Recently, electronic devices which use speech recognition technology are used in various fields. As one example, a clock which is called a sound clock can be listed. In this sound clock, a current time and an alarm time can be set by sound, and the sound clock can inform a user of a current time by sound.

This type of sound clock can be used as a toy for children in addition to being used as a daily necessity. It is desired that the cost of the device itself be as low as possible. Because of this, there is a large limitation on the CPU processing capability and memory capacity which are used. One of the problems to be solved is to have functions with high capability under these limitations.

In this type of sound clock, when current time or alarm time setting is performed, generally, for example, when "a.m.", "1 o'clock", and "20 minutes" are set, first, "a.m.", is spoken and recognized. Subsequently, "1 o'clock" is spoken and recognized. Then, "20 minutes" is spoken and recognized. Thus, an operation is performed such that each word is spoken and recognized.

However, in order to recognize a content which forms a group which is thus structured by a plurality of words, the operation where each word is spoken and recognized is troublesome, and there are many problems in terms of using the device.

In order to solve this problem, it is effective to continuously speak the content which forms the group which is structured by a plurality of words and recognize the continuously spoken words as-is. However, among the words which forms the group, there are words which are easily recognized and words which are not easily recognized. Therefore, it is difficult to recognize both types of words.

For example, in the example described earlier, when "a.m.", "5 o'clock", and "20 minutes" are continuously spoken and recognition processed, if "a.m., 9 o'clock, 20 minutes" is output as a recognition result of the device, the speaker realizes that a misrecognition has occurred. Therefore, the speaker again speaks "a.m.", "5 o'clock", and "20 minutes", the recognition processing needs to be performed again, and there is a problem of spending too much time until all the words are correctly recognized.

SUMMARY OF THE INVENTION

Therefore, an object of this invention is to provide a continuous word recognition method used in the speech recognition device, and also a recording medium on which is recorded a continuous word recognition processing program used in a speech recognition device, which can effectively and reliably recognize continuous words which form one grouped content which is structured by a plurality of words, and which, particularly, is extremely effective when time setting is performed.

In order to solve the objections described above, this invention provides a continuous word recognition method in a speech recognition device which has one group of contents formed by a plurality of words, inputs continuous word sounds which are continuously spoken with a small interval between words and recognition processes the continuous word sounds, and outputs the recognition result.

The method may include recognition processing all of the input continuous words, outputting the recognition result of all of the continuous words, inputting a response from a speaker showing affirmative/negative with respect to the recognition result and recognition processing the response, determining whether the response from the speaker is affirmative, confirming the recognition result as all of the continuous words when it is determined that the response is affirmative and, when it is determined that the response is negative, outputting the recognition result word by word from a first to an nth (n is a positive integer) of the words that form the continuous words, confirming the recognition result for each word by determining an affirmative or negative from the speaker with respect to the recognition result for each word, and obtaining a correct recognition result for each word.

Furthermore, a process of outputting the recognition result word by word from a first to an nth words that form the continuous words, confirming the recognition result for each word by determining an affirmative or negative from the speaker for the recognition result for each word, and obtaining a correct recognition result for each word, may include outputting a predetermined m (m is a positive integer) candidates in order, starting with a first candidate, with respect to a word which is a current processing target (defined as a recognition target word) among the first to the nth of the words that form the continuous words, inputting a response from the speaker showing affirmative/negative per output candidate and recognition processing the response, confirming the candidate as the recognition target word when the response of the speaker is determined to be affirmative, outputting a following candidate when the response of the speaker is determined to be negative, inputting the response from the speaker showing affirmative/ negative with respect to the newly output candidate and recognition processing the candidate, confirming the candidate as the recognition target word when the response of the speaker is determined to be affirmative, outputting a following candidate if negative is determined, and performing this processing up to the mth candidate.

Furthermore, a request to speak the recognition target word again is output to the speaker when the response with respect to the mth candidate is negative.

Additionally, when a word among the first to the nth (n being a positive integer) words that form the continuous words is a word which is mutually exclusive in terms of a meaning, one of two words is output as a recognition result, and when the response from the speaker showing affirmative/negative with respect to the output is negative, the other word of the two words is confirmed as a recognition result at that point.

A recording medium on which is recorded a continuous word recognition processing program of this invention used in in a speech recognition device that has a group of contents formed by a plurality of words, inputs continuous word sounds which are continuously spoken with a short interval between words and recognition processes the continuous word sounds, and outputs the recognition result. The processing program may include a first step of recognition processing all of the input continuous words, a second step of outputting a recognition result of all of the continuous words through this recognition processing, inputting a response from a speaker showing affirmative/negative of the recognition result with respect to the output and recognition processing the response, and determining whether the response from the speaker is affirmative, and a third step of confirming the recognition result as all of the continuous words when the response of the speaker is determined to be affirmative by the determination result, and, when the response of the speaker is determined to be negative, outputting the recognition result word by word from a first to an nth (n is a positive integer) words that form the continuous words, and obtaining a correct recognition result per word by determining the affirmative/negative of the speaker for the recognition result for each word.

Additionally, the process of outputting the recognition result word by word from a first to an nth words that form the continuous words, confirming the recognition result for each word by determining an affirmative or negative from the speaker for the recognition result for each word, and obtaining a correct recognition result for each word in the third step, may include outputting a predetermined m (m is a positive integer) candidates in order, starting with a first candidate, with respect to a word which is a current processing target (defined as a recognition target word) among the first to the nth words that form the continuous words, inputting a response from the speaker showing affirmative/negative per output candidate and recognition processing the response, confirming the candidate as the recognition target word when the response of the speaker is determined to be affirmative, outputting a following candidate when the response of the speaker is determined to be negative, inputting the response from the speaker showing affirmative/negative with respect to the newly output candidate and recognition processing the candidate, confirming the candidate as the recognition target word when the response of the speaker is determined to be affirmative, outputting a following candidate if negative is determined, and performing this processing up to the mth candidate.

Furthermore, a request to speak the recognition target word again is output to the speaker when the response with respect to the mth candidate is negative.

Additionally, when a word among the first to the nth (n is a positive integer) words that form the continuous words is a word which is mutually exclusive in terms of a meaning, one of two words is output as a recognition result, and when the response from the speaker showing affirmative/negative with respect to the output is negative, the other word of the two words is confirmed as a recognition result at that point.

This invention is effective when it is applied to an interactive type speech recognition device which outputs the recognition result as a speaker inputs continuous word sounds which form a group which is structured by a plurality of words and which are continuously spoken with a small interval between words, and this continuous word sound is recognition processed.

First, all of the continuous words which have been input are recognition processed, the recognition result of all of the continuous words are output, a response from the speaker showing affirmative/negative of the recognition result (for example, "yes" or "no") is input, and this "yes" or "no" is recognition processed. If the response from the speaker is determined to be affirmative ("yes"), the continuous words which have been input are confirmed by the recognition result. If the response is negative, for each word from a first to an nth (n is a positive integer) which structures the continuous words, the content from the speaker showing affirmative or negative is recognized in order, affirmative or negative is determined, and the recognition processing target word at that point is confirmed by the recognition result.

By so doing, the speaker can speak the continuous words all together and can easily perform a sound inputting operation. Furthermore, because the device performs speech recognition processing for all of the continuous words and the result is output, if it is correct, the recognition result of the continuous words at that point can be confirmed, and the corresponding following processing can begin. Therefore, effective processing is possible. Additionally, if the recognition result of any word among the continuous words is not correct, the recognition result of the respective words is output, affirmative/negative is determined in order for each of the words which structure the continuous words, and the recognition result for each word is confirmed so that confirmation processing of an accurate recognition result can be performed.

Additionally, with respect to one word, if a candidate which has been preset (mth candidate) is negative, a speaking request is again output for the recognition processing target word and recognition processing is performed for the speaker so that confirmation of an accurate recognition result can be performed.

Thus, this invention is a continuous word recognition method with both convenience and accuracy.

Furthermore, if a recognition processing target word is a mutually exclusive word, when one of two words is output as a recognition result, if the response from the speaker showing affirmative/negative is negative, the other word is confirmed as the recognition processing target word at that point.

For example, if the recognition processing target word is "a.m.", it will be selected among "a.m." and "p.m.". Therefore, if the recognition result of "a.m." is negative, "p.m." is confirmed as the recognition result at the point. By also performing this type of processing, it is possible to effectively confirm a recognition result.

DETAILED DESCRIPTION OF PREFERRED EMBODIMENTS

The following explains an embodiment of this invention with reference to the drawings. Furthermore, in this embodiment, a sound clock device is explained as one example of a speech recognition device. This sound clock device (hereafter occasionally referred to as a device) can set a current time and an alarm time by a sound spoken by a speaker. Furthermore, informing the user of the time from the device can be performed by sound, and this is a device which has a strong toy feature in which a simple conversation can be carried out between the device and the speaker.

Figure 1:
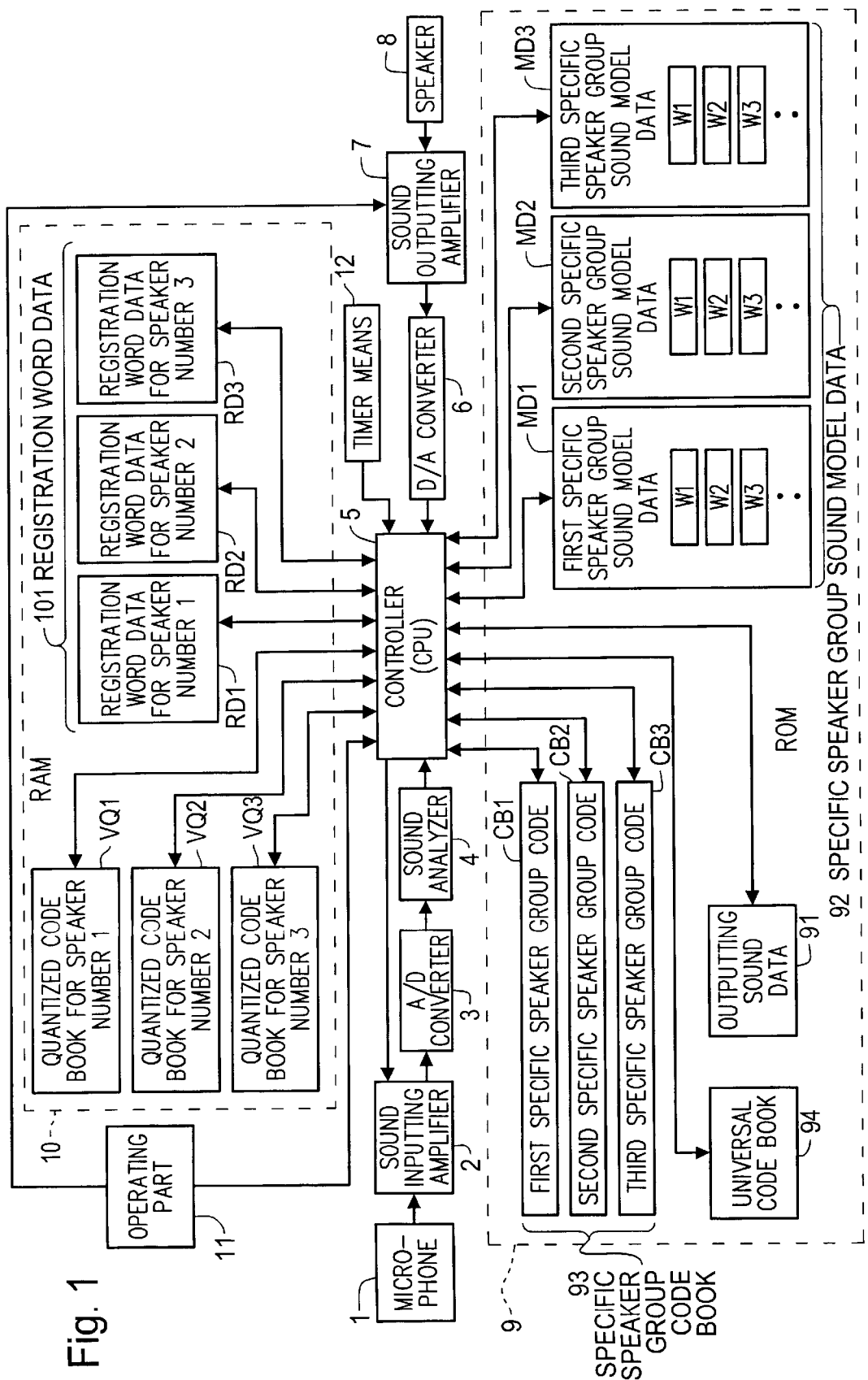
FIG. 1 is a block diagram explaining one embodiment of a speech recognition device of this invention.

FIG. 1 is a block diagram showing each structural element which is needed for the structure of a sound clock device which is an embodiment of this invention. First, the structure shown in FIG. 1 is schematically explained, and after that, the parts which are particularly needed for the explanation of the embodiment of this invention are described in detail.

This sound clock device is basically structured by a microphone 1 as a sound inputting part, a sound inputting amplifier (microphone amplifier) 2, an A/D converter 3, a sound analyzer 4, a controller (CPU) 5 which performs various processing, a D/A converter 6, a sound outputting amplifier 7 as a sound outputting part, a speaker 8, a ROM 9, a RAM 10, an operating part 11 with which a user performs various settings for the device, and a clock 12 which generates a clock signal.

The sound analyzer 4 analyzes an A/D-converted sound signal for a short time by using a calculator, obtains a pitch cycle and/or the like, and outputs characteristic data which shows the characteristics of the sound (LPC cepstrum coefficient is generally used as time series data.

The controller 5 performs various processing, explained hereafter, such as speech recognition, learning, registration, and sound outputting. These processes will be explained in the operation explanation discussed below.

ROM 9 stores outputting sound data 91, specific speaker group sound model data 92, a code book (specific speaker group code book) 93 which has been created based upon the specific speaker group sound model data 92, a universal code book 94, and the like.

The outputting sound data 91 is sound data for the conversation content which performs responses and inquiries to the speaker from the device side, and the specific content will be explained in the operation example discussed below.

Furthermore, the specific speaker group sound model data 92 is standard speaker sound model data for the recognition target speaker which has been focused into a certain area. For example, when the recognition target speaker is focused on children, this is standard speaker sound model data which has been created from the sound data of many non-specific children.

However, in this embodiment, three speaker groups such as male adults, female adults, and children are set. Male adults are defined as a speaker group A, female adults are defined as a speaker group B, and children are defined as a speaker group C. Furthermore, a first specific speaker group sound model data MD1 which has been created from the sound data of many non-specific male adults who belong to the speaker group A, a second specific speaker group sound model data MD2 which has been created from the sound data of many non-specific female adults who belong to the speaker group B, and a third specific speaker group sound model data MD3 which has been created from the sound data of many non-specific children who belong to the speaker group C, are provided.

Furthermore, the first through third specific speaker group sound model data MD1, MD2, and MD3 include several word sets w1, w2, and w3 . . . formed of predetermined recognizable words. The specific speaker group sound model data which is stored in the word set w1 is specific speaker group sound model data for words (in this case, assumed to be the words "good morning", "I'm home", "good afternoon", "good night", "o'clock", and "alarm") which are considered to be used particularly frequently during conversation between the device and the speaker. The specific speaker group sound model data for the respective words within the word set w1 can be used as speaker learning processing, as discussed below.

The specific speaker group sound model data which is stored in the word set w2 is specific speaker group sound model data for the words which show hour units such as "1 o'clock", "two o'clock", "three o'clock". . . "twelve o'clock". Furthermore, the specific speaker group sound model data which is stored in the word set w3 is specific speaker ground sound model data for the words which show minute units such as "one minute", "two minutes", "three minutes". . . "fifty-nine minutes".

In addition, the specific speaker group sound model data for the words which are needed to carry out conversation between the speaker and the device, words which show affirmative and negative feelings such as "yes" and "no", and the like are provided as word sets which are not illustrated here.

Furthermore, the specific speaker group code book 93 has a first specific speaker group code book CB1 which has been created based upon the first specific speaker group sound model data MD1, a second specific speaker group code book CB2 which has been created based upon the second specific speaker group sound model data MD2, and a third specific speaker group code book CB3 which has been created based upon the third specific speaker group sound model data MD3.

Incidentally, words such as "good morning", "I am home", "good afternoon", "good night", "what time", and "alarm" which belong to the above-mentioned word set w1 are used as registration words. As recognition target speakers, that is, the respective speakers who use this device (assumed here to be three speakers such as speaker number 1, speaker number 2, and speaker number 3), speak the above-mentioned registration words, the respective characteristic data can be stored in RAM 10 as the registration word data 101.

This registration word data 101 is saved for each speaker who is anticipated to use this machine, such as registration word data RD1 for speaker number 1, registration word data RD2 for speaker number 2, and registration word data RD3 for speaker number 3.

Furthermore, a function which creates registration word data for several words can be arbitrarily performed by a user for a speaker who is anticipated to use the device. Therefore, creating and saving the registration word data by using the function is possible, but it is not always necessary to use the function. In order to carry out this function, predetermined mode setting is performed by the operating part 11 and registration is performed, but the registration method and the like will be discussed later.

In addition, RAM 10 stores a post-quantization inputting speaker code book VQ1 which has been created for speaker number 1, a post-quantization inputting speaker code book VQ2 which has been created for speaker number 2, and a post-quantization inputting speaker code book VQ3 which has been created for speaker number 3, but each code book will be discussed later.

One of the characteristics of the device in this embodiment of this invention is to focus a user who uses the device into a certain area, to create specific speaker group sound mode data which has been created from the sound data of many non-specific speakers which belong to the area, and to recognize and process the sound spoken by the user of the device by using the specific speaker group sound model data.

In order to realize this, in this embodiment, users are divided into a speaker group A (male adults), a speaker group B (female adults) and a speaker group C (children). First through third speaker group sound model data MD1, MD2, and MD3, which have been created from the sound data of many non-specific speakers which belong to the respective groups, are provided.

Thus, by focusing the users who use the device into a certain area and using the standard speaker sound model data (first through third speaker group sound model data MD1, MD2, and MD3 in this embodiment) which has been created from the sound data of many non-specific speakers which belong to the area, the size of the standard speaker sound model data can be significantly reduced compared to the case when the standard speaker sound model data for non-specific speakers for a variety of speakers is used, memory size of the ROM 9 can be reduced, and the processing burden of the controller (CPU) 5 can be reduced.

Furthermore, because the speech recognition is performed by using the specific speaker group sound model data (first through third specific speaker group sound model data MD1, MD2, and MD3) according to the respective speaker groups, high recognition percentage can be obtained, compared to the case when the standard speaker sound model data for non-specific speakers is used for a variety of speakers.

Furthermore, with respect to the selection of the specific speaker group sound model data for the speaker who is speaking at a given point in time, for example, buttons are prepared on the operating part 11 which designate the speaker groups, and sound input can be performed after the operation of the button which designates the speaker group C, for example, if the user of the device is a child.

Thus, when the operation of designating the speaker group is performed, the controller 5 determines that the operation has been performed, and speech recognition is performed by using the corresponding specific speaker group sound model data. For example, when the button which designates the speaker group C is operated, the controller 5 determines that it is has been operated, and then speech recognition is performed by using the specific speaker group sound model data MD3.

Furthermore, separately from the above operation, the controller 5 can determine the speaker group of the input sound, based upon the pitch cycle information of the sound which has been input (pitch cycle information which can be obtained when the sound analyzer 4 analyzes the sound) without performing the setting operation of the speaker group by the user of the device, and the speech recognition can be performed by using the corresponding specific speaker group sound model data based upon the determination result.

Figure 2:
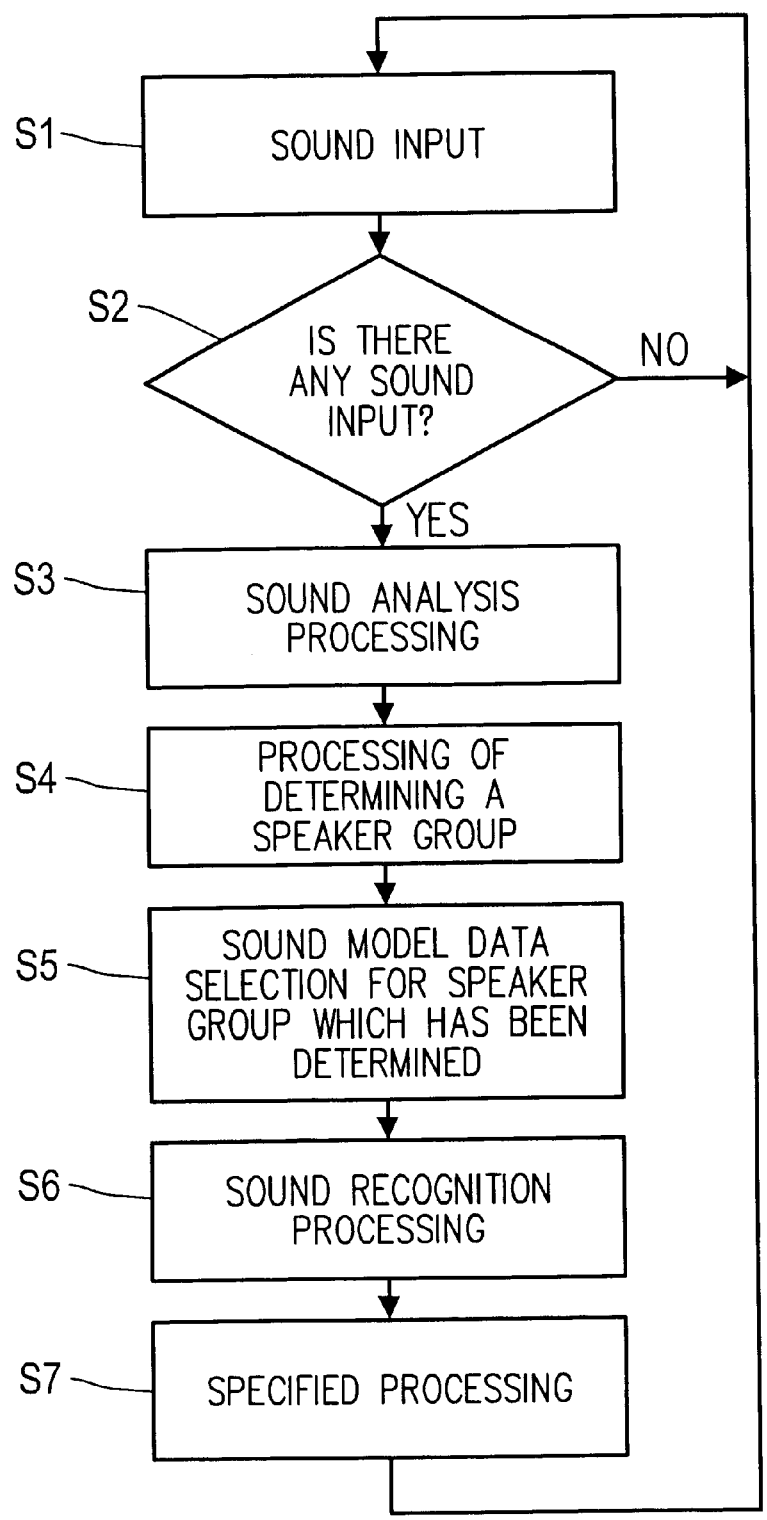
FIG. 2 is a flowchart explaining an example of performing speech recognition processing using sound model data (specific speaker group sound model data) corresponding to a speaker.

FIG. 2 shows a flowchart which performs speech recognition processing by using the sound model data in response to the speaker. Sound spoken by the speaker is input (step s1), it is determined whether sound is input (step s2), and sound analysis is performed for the input sound by the sound analyzer 4 if the sound is input (step s3). Furthermore, through the controller 5, based upon the analysis result, it is determined to which respective speaker group the sound belongs (step s4), the sound model data is selected according to the determined speaker group (step s5), and speech recognition processing is performed (step s6). Furthermore, specified processing is performed based upon the recognition result (step s7). This specified processing is various processing in which the device is to perform, such as time setting and alarm setting.

Additionally, in this embodiment, with respect to a specific word, the user who uses the device registers the sound data by speaking the specific word, and by using the registered data and the above-mentioned specific speaker group sound model data, speaker learning processing can be performed. Hereafter, this will be discussed.

In order to perform the speaker learning processing, in this embodiment, a user (speaker) speaks words (these words are defined as registration words) which belong to the above-mentioned word set w1 such as "good morning", "I'm home", "good afternoon", "good night", "what time", and "alarm". By the sound data for the respective registration words which is obtained from the speaker, the registration word data is created and is registered in the RAM 10. At this point, for example, if the device is used by one family, registration word data is created by the respective sound data which is obtained from sound successively spoken by the members of the family (for example, father, mother, and children) with respect to a plurality of registration words, and this data is respectively registered.

Specifically, for example, registration word data for the respective registration words which has been created by the respective sound data for the respective registration words which has been obtained from the father (speaker number 1), for example, is saved as speaker number 1 registration word data RD1. The registration word data for the respective registration words which has been created by the sound data for the respective registration words which is obtained from the mother (speaker number 2) is saved as speaker number 2 registration word data RD2. The registration word data for the respective registration word which has been created by the respective sound data for the respective registration words which is obtained from the child (speaker number 3) is saved as speaker number 3 registration word data RD3. The registration is performed as follows.

First of all, mode setting for registering words is performed through the operating part 11. Furthermore, speaker number 1 is designated, and the respective registration words described earlier are successively spoken by speaker number 1. Further, the registration word data RD1 for the registration words is created according to the sound data for the respective registration words which is obtained from speaker number 1. Furthermore, based upon this registration word data RD1 and the specific speaker group sound model data (specific speaker group sound mode data MD1 in this case), a mapping function is created for speaker number 1.

Subsequently, speaker number 2 is designated, and speaker number 2 successively speaks the respective registration words described earlier. Furthermore, registration word data RD2 for the respective registration words is created according to the sound data for the respective registration words which is obtained from speaker number 2. Then, based upon the registration word data RD2 and the specific speaker group model data (specific speaker sound model data MD2 in this case), a mapping function is created for speaker number 2.

Next, speaker number 3 is designated, and the respective registration words described earlier are successively spoken for speaker number 3. Registration word data RD1 for the respective registration words is created according to the sound data for the respective registration words which is obtained from speaker number 3. Furthermore, based upon the registration word data RD3 and specific speaker group sound model data (specific speaker group sound model data MD3 in this case), a mapping function is created for speaker number 3.

Thus, the registration of the sound data of the speakers to be registered is completed. Furthermore, by using the respective mapping functions and the first through third specific speaker group code books CB1, CB2, and CB3 (code book size is 256 kb size, for example, respectively), inputting speaker code books are created for the respective speaker numbers 1, 2, and 3. A method which thus creates inputting speaker code books is called a code book mapping method.

In this case, because the speaker number 1 is a father, the speaker number 2 is a mother, and the speaker number 3 is a child, an inputting speaker code book for the father, an inputting speaker code book for the mother, and an inputting speaker code book for the child are respectively created. Furthermore, in this embodiment, in order to reduce the data amount of the inputting speaker code books, by using a universal code book 94 which has been prepared in advance, vector quantization is performed.

This universal code book 94 is a code book which is obtained from a wide variety of speakers including all speakers from adults to children. For example, it has a large size such as 1024 or 2048 kb. Vector quantization is performed in the universal code book 94, and code books (256 kb size) are created according to only the code numbers of the universal code book 94.

Thus, by code-booking only by the code numbers of the universal code book 94, the data amount can be significantly reduced.

For example, if some 32 kilobytes of RAM is used for the RAM 10 which is used for the device, in the above-mentioned inputting speaker code book, with respect to one code book, with 256×10 (this 10 is dimensional number of the LPC cepstrum coefficient and this is the case when 10 dimensions are used), 2,560 coefficients must be saved. When one coefficient is saved as a short type, a total of about 5 kilobytes, such as 2 bytes×2,560, is needed.

Therefore, assuming that four code books are created, a capacity of about 20 kilobytes is needed for just the four code books, and the majority of RAM 10 is occupied and other processing will be hindered.

In order to solve this problem, as described earlier, vector quantization is performed in the universal code book 94, and vector-quantized inputting speaker code books are created according to only the code numbers of the universal code book 94. Furthermore, hereafter, vector-quantized inputting speaker code books are called quantized code books. The code book which has quantized corresponding to speaker number 1 is called quantized code book VQ1, the inputting speaker code book which has been quantized corresponding to speaker number 2 is called quantized code book VQ2, and the inputting speaker code book which has been quantized corresponding to speaker number 3 is called quantized code book VQ3.

By so doing, a quantized inputting speaker code book for one speaker (for example, a quantized inputting speaker code book VQ1) can save 256 code numbers. When each code number is saved in short style, a total capacity of about 0.5 kilobyte (2 bytes×256) is acceptable. Therefore, the memory capacity which is needed for a code book is 1/10, compared to the pre-quantization inputting speaker code book described earlier.

Furthermore, this universal code book 94 can be used for quantized of the registration word data RD1, RD2, and RD3 for the respective inputting speakers described earlier.

Figure 3:
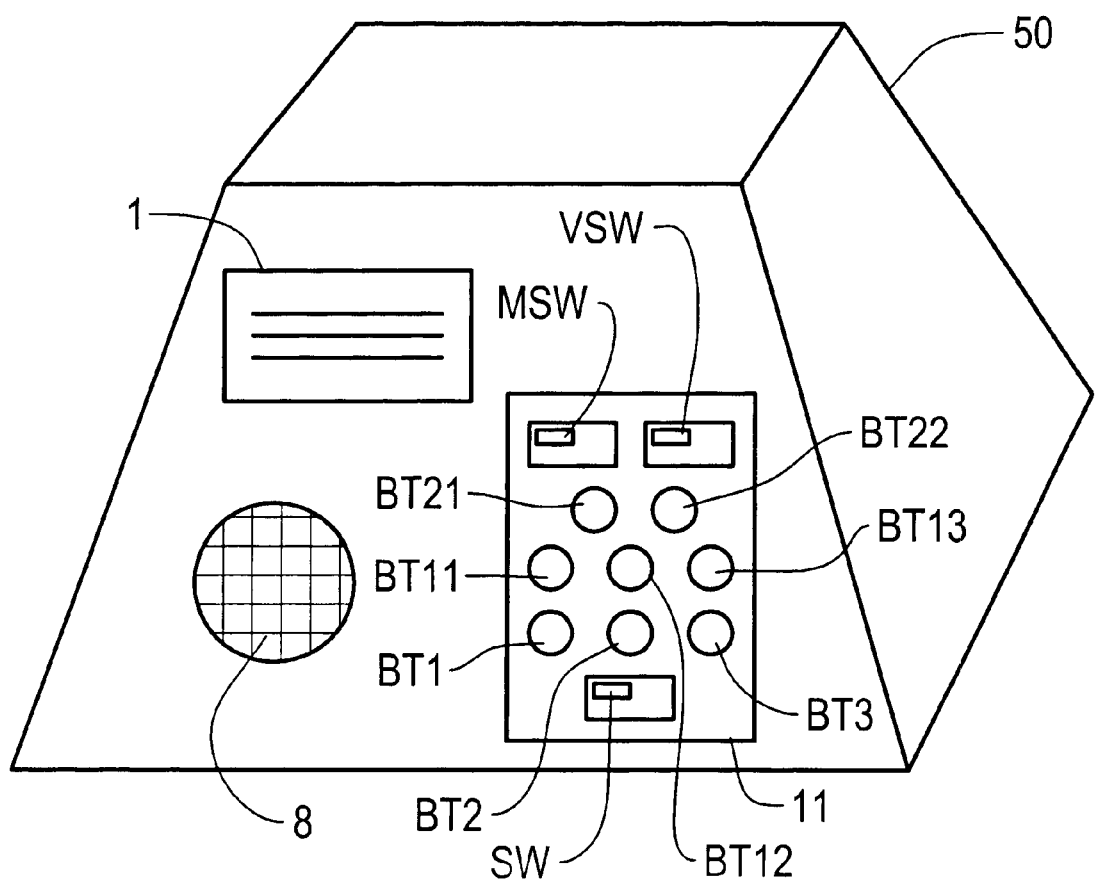
FIG. 3 is a schematic diagram showing the external appearance of a sound clock device in one embodiment of this invention.

FIG. 3 is an external structure of a sound clock device of this embodiment. As described earlier, the sound clock device in this embodiment has a strong toy feature. In fact, characters from popular cartoons can be used for the appearance, but the appearance is not directly related to this invention, so a simple format is used for the explanation.

In FIG. 3, in the case 50 of the sound clock device, a microphone 1, a speaker 8, and an operating part 11 which has various operating buttons (details will be discussed later) which are operated in order to perform operations and when various settings are performed for the device are provided.

This operating part 11 has, for example, a power switch SW, speaker group designation buttons BT1, BT2, and BT3, speaker designation buttons BT11, BT12, and BT13, a mode change switch (whose function will be discussed later) MSW which changes between recognition mode and registration mode, a affirmative button BT21 and a negative button BT22 which input affirmative ("yes") or negative ("no") by the operation of the button by the speaker in response to inquiries from the device side (specific operation examples will be discussed later), and a volume adjusting switch VSW.

Furthermore, the speaker group designation buttons BT1, BT2, and BT3 designate the speaker group of the user who uses the device. The speaker group designation button BT1 designates male adults as a speaker group (speaker group A), the speaker group designation button BT2 designates female adults as a speaker group (speaker group B), and the speaker group designation button BT3 designates children as a speaker group (speaker group C).

The speaker designation buttons BT11, BT12, and BT13 designate the user who uses the device as a speaker, and three users (speaker number 1, speaker number 2, and speaker number 3) can be designated.

Additionally, the various switches and various operating buttons described earlier can be provided in the operating part 11 shown in FIG. 3, but this is an example in which switches and operating buttons are disposed for the convenience of explaining this embodiment. Therefore, they do not always need to all be provided, and it is acceptable to provide only the switches and the operating buttons that are necessary and appropriate according to the functions which the device has. Furthermore, switches such as the power switch SW can or may? be disposed separately from the operating buttons, rather than the operating part 11.

Additionally, the structure shown in FIG. 3 is one example used for explanation, so the arrangement of the operating part 11, the speaker 8, and the microphone 1, are the arrangement of the various switches and operating buttons within the operating part 11, are not limited to what is shown.

Here, the registration mode and the recognition mode are explained. The setting of either of the registration mode and recognition mode is performed by the mode change switch MSW.

In the registration mode, each speaker who will use the device (speaker number 1, speaker number 2, and speaker number 3) speaks a predetermined plurality of registration words. The registration word data which has been created from the respective sound data is registered as registration word data RD1, RD2, and RD3. Additionally, the speaker learning processing is performed by using the registration word data RD1, RD2, and RD3. Ultimately, the speaker number 1 quantized code book VQ1, the speaker number 2 quantized code book VQ2, and the speaker number 3 quantized code book VQ3 are created.

Specific processing is explained in the case of the registration mode. Here, as described earlier, the registration word data which has been obtained is registered for the father (speaker number 1), the mother (speaker number 2), and the child (speaker number 3) as they speak the respective registration words.

First of all, the speaker designation button BT11 of the operating part 11 is operated, and the registration words described earlier are successively spoken by speaker number 1 (father) in the registration mode of speaker number 1. By so doing, the registration data RD1 of the registration words is created for speaker number 1. Additionally, a mapping function is created, and vector quantization is performed in the universal code book 94. The quantized inputting speaker code book VQ1 of the speaker number 1 is created according to the code numbers of the universal code book 94.

Subsequently, the speaker designation button BT12 of the operating part 11 is operated, and the registration words described earlier are successively spoken by speaker number 2 (mother) in the registration mode of speaker number 2. By so doing, the registration data RD2 of the registration words is created for speaker number 2. Additionally, a mapping function is created, and vector quantization is performed in the universal code book 94. The quantized inputting speaker code book VQ2 of speaker number 2 is created according to the code numbers of the universal code book 94.

Continuing further, the speaker designation button BT13 is operated and the registration words described earlier are successively spoken by speaker number 3 (child) in the registration mode of speaker number 3. By so doing, the registration data RD3 of the registration words is created for speaker number 3. Additionally, a mapping function is created, and vector quantization is performed in the universal code book 94. The quantized inputting speaker code book VQ3 of speaker number 3 is created according to the code numbers of the universal code book 94.

Furthermore, at this time, the registration word data RD1, RD2, and RD3 are also vector-quantized using the universal code book 94. Hereafter, the registration word data RD1, RD2, and RD3 is also quantized data.

The following explains the recognition mode. In this case, this recognition mode is a mode which recognizes the sound by using one of the first through third specific speaker group sound model data MD1, MD2, and MD3, the registration word data RD1, RD2, and RD3 for speaker numbers 1, 2, and 3, and the quantized code books VQ1, VQ2, and VQ3 of the speaker numbers 1, 2, and 3, depending upon the situation.

For example, if the mode change switch MSW is in the registration mode, first of all, the speaker who uses the device sets which speaker group is needed. For example, if a speaker who uses the device is speaker number 3 (child), after operating the speaker group designation button BT3 to designate the speaker group C, sound inputting is performed. By so doing, in the controller 5, speech recognition is performed using the third specific speaker group sound model data MD3.

Thus, when the speaker group designation operation is performed by a speaker who uses the device, the controller 5 determines that the speaker group designation operation is performed, and speech recognition is performed using the corresponding specific speaker group sound model data.

Thus, by focusing a user into a specific speaker group and performing speech recognition using specific speaker group sound model data created from the sound data of the speaker which belongs to the speaker group, speech recognition can be performed with higher recognition percentage than in the case when the speech recognition is performed by using a large size of the standard speaker sound model data for a variety of users. Furthermore, because it is acceptable to have specific speaker group sound model data for only several speaker groups, it is possible to significantly reduce the size of the sound model data and minimize the memory size of the ROM 9. Thus, the processing burden on the controller (CPU) 5 can be minimized.

Additionally, the determination as to which speaker group the speaker belongs can be made automatically by the device through pitch cycle information which can be obtained by analyzing the sound which has been input. Furthermore, there is also a method of determining to which speaker group the speaker belongs by using a similarity degree which can be obtained by matching the input sound data with the registration word data. The case where the speaker group is determined by pitch cycle information only is discussed here.

That is, in the case of three speakers such as a father, a mother, and a child, the pitch cycle of the child is normally the shortest, the pitch cycle of the mother is normally the second to the shortest, and the pitch cycle of the father is normally the longest among the three family members. According to the pitch cycle information, it can be determined which speaker among the speaker numbers 1, 2, and 3 is speaking.

Thus, for example, when it is determined that the inputting speaker is speaker number 1, speech recognition can be performed using the registration word data RD1 and the quantized inputting speaker code book VQ1 which has been created by the speaker learning processing corresponding to speaker number 1. That is, when a word spoken by speaker number 1 is a registration word, speech recognition is performed through the registration word data RD1 corresponding to speaker number 1. With respect to other than the registration words, the speech recognition is performed using the quantized inputting speaker code book VQ1. Furthermore, if the registration word data is not created and the speaker learning processing is not performed, the speech recognition is performed using the specific speaker group sound model data 92.

Furthermore, in this invention, as the procedure of a conversation which is carried out between the device and the speaker, first of all, any of the registration words among the registration words described above can be spoken by the user. That is, on the device side, first of all, a conversation procedure is set which recognizes a registration word which belongs to the word set w1. Thus, in this invention, according to the operation scene at that time, the device can find out which word set a word is input from at the current time. Furthermore, recognition processing of the word which is input at that time can be performed.

Therefore, as the beginning of the conversation, for example, if speaker number 1 first speaks "alarm" to the device as one of the registration words, sound analysis for "alarm" can be performed, and the speaker is specified on the device side by the pitch cycle information which is thereby obtained. In this case, it is determined that the inputting speaker is speaker number 1, and the sound spoken by the user is recognized as "alarm" as the speech recognition processing is performed using the registration word data RD1 for speaker number 1 with respect to the inputting sound.

Thus, as the inputting speaker inputs a registration word, the device determines which speaker is the inputting speaker, and recognition is performed for a registration word. Furthermore, if the sound input thereafter is a word other than a registration word (word other than the words in the word set w1), the speech recognition operation is performed without determining the speaker.

For example, when the current device side operation scene is a scene in which a registration word is recognized, after the recognition processing of the registration word is completed, if a scene where word set w2 or w3 (assume word set w2) is recognized is set as the next scene, for speech recognition processing through speaker adaptation, the recognition of the word set w2 is performed using the quantized code book VQ1 of the speaker number 1, the first specific speaker group code book CB1, and the first specific speaker group sound model data MD1 (sound model data corresponding to the word set w2).

Figure 4:
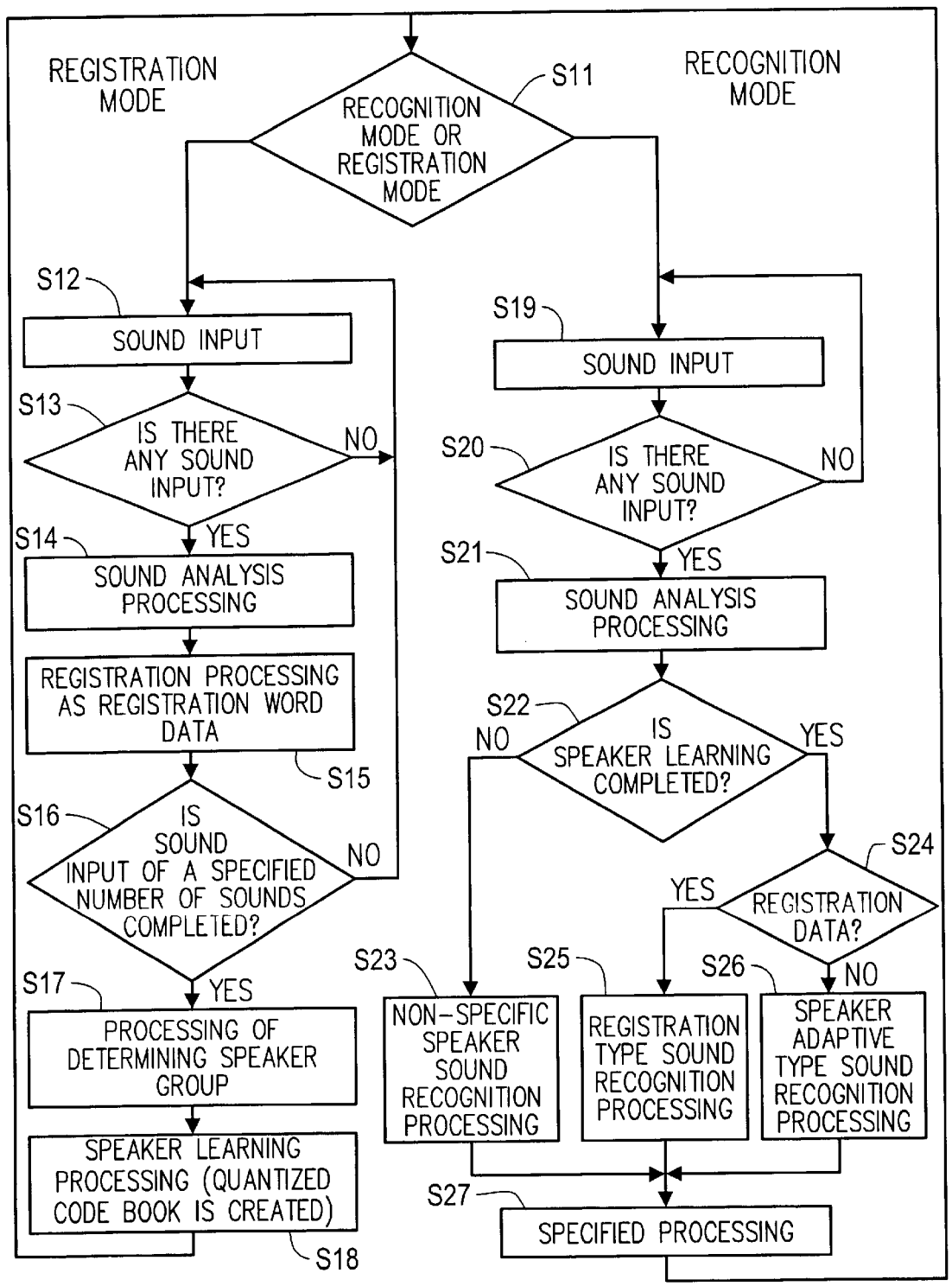
FIG. 4 is a flowchart explaining the processing procedure for a specific speaker and explaining the entire processing procedure of the speech recognition processing which can perform the speaker learning processing.

FIG. 4 is a flowchart explaining the overall processing procedure of the speech recognition processing which can perform the speaker learning processing explained above. Furthermore, the flowchart shown in FIG. 4 shows a processing procedure where the speaker is limited to one certain speaker.

In FIG. 4, first of all, it is determined whether the device is in the recognition mode or a registration mode (step s11). When it is the registration mode, sound inputting is performed for the registration words spoken by the speaker (step s12) and the device determines whether the sound inputting has been performed (step s13). If sound inputting has been performed, sound analysis of the sound which has been input is performed (step s14), and the input sound data is registered as registration word data (step s15).

Additionally, the device determines whether the input of the sound data has been completed with respect to the words to be registered (step s16). If it has been completed, it is determined to which speaker group the sound data of the input sound belongs (step s17). The speaker learning processing described earlier is performed (inputting speaker code book is created and the quantized code book is ultimately created) (step s18).

Meanwhile, when it is determined that it is the recognition mode in step s11, the sound spoken by the speaker is input (step s19), and it is determined whether sound input has been performed (step s20). If the sound input has been performed, sound analysis is performed by detecting the sound divisions of the input sound (step s21).

Furthermore, it is determined whether speaker learning processing is performed (step s22). If the speaker learning processing is not performed, speech recognition processing is performed by non-specific speaker speech recognition (specific speaker group sound model data 92 in this embodiment (it is specific speaker group sound model data which has been prepared corresponding to the input speaker, which is first specific speaker group sound model data if the input speaker is the speaker number 1)) (step s23), and the processing of step s24 and after is performed if the speaker learning processing is performed.

In step s24, it is determined whether the sound data for the input sound is registration word data. If it is registration word data, as a registration type of speech recognition processing, the speech recognition processing is performed using the registration word data 101 (registration word data created by the sound of the input speaker at this point and if the inputting speaker is speaker number 1, it is registration word data RD1 for speaker number 1) (step s25).

Furthermore, when it is not registration word data, as a speaker adaptive type of speech recognition processing, and sound recordation processing is performed using a quantized code book (if the inputting speaker is speaker number 1, quantized code book VQ1 for the speaker number 1 is used) which has been created based upon the sound of the inputting speaker, a specific speaker group code book (if the inputting speaker is speaker number 1, the first specific speaker group code book CB1 is used), and specific speaker group sound model data (if the inputting speaker is speaker number 1, the first specific speaker group sound model data MD1 is used) (step s26).

Incidentally, in the case of this device, as described earlier, recognizable words include a plurality of word sets, such as word sets w1, w2, and w3. As described earlier, the device knows what word set is currently input. For example, the device knows what scene is current, such as knowing that after the scene where the word set w1 (registration word) is input is completed, the scene where the word set w2 (hour unit such as "1 o'clock" and "two o'clock") is input is current.

Therefore, in step s24 described earlier, the determination as to whether the sound data for the input sound is registration word data depends on what scene is current. If it is a scene where a registration word is input, the word data to be input is assumed to be registered data, and corresponding processing is performed.

Furthermore, when the speech recognition processing is completed, predetermined processing is performed based upon the recognition result (step s27).

Figure 5:
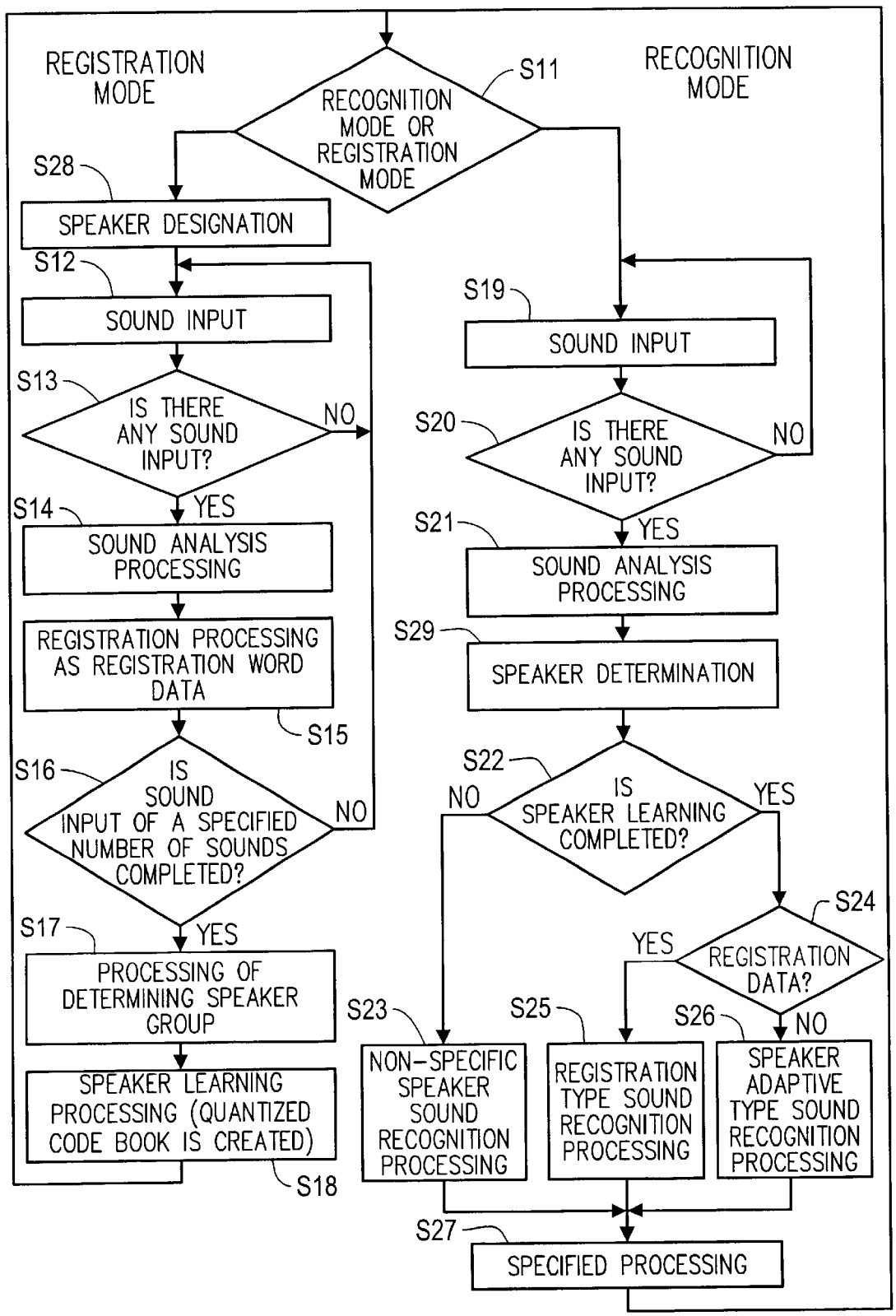
FIG. 5 is a flowchart explaining the processing procedure for a plurality of speakers and explaining the entire processing procedures of speech recognition processing which can perform the speaker learning processing.

The processing shown in FIG. 4 is a process for a specific speaker. However, for example, if a plurality of speakers such as speaker numbers 1, 2, and 3 exist as described earlier, as shown in a flowchart of FIG. 5, in the case of the registration mode, a step s28 of performing speaker designation (for example, designation of speaker numbers 1, 2, and 3) before the sound input step s12 is added. Therefore, in this case, as shown in FIG. 1, for the registration word data, registration word data RD1, RD2, and RD3 are created for the speaker numbers 1–3. For the quantizied code books, quantized code books VQ1, VQ2, and VQ3 are created for speaker numbers 1–3.

Meanwhile, in the case of the recognition mode, after the sound analysis processing of step s21, speaker determination processing (step s29) which determines which speaker is the inputting speaker among, for example, speaker numbers 1, 2, and 3, is added.

Furthermore, in the case of registration words, the speech recognition processing here is performed by using one of the registration word data RD1, RD2, and RD3 for speaker numbers 1, 2, and 3 which have been created based upon the sound data of speaker numbers 1, 2, and 3. If it is not a registration word, then speech recognition is performed using one of the following groups, the quantized code book VQ1 for speaker number 1, the first specific speaker group code book CB1 and the first specific speaker group sound model data MD1, quantized code book VQ2 for speaker number 2, the second specific speaker group code book CB2 and the second specific speaker group sound model data MD2, or the quantized code book VQ3 for speaker number 3, the third speaker group code book CB3 and the third specific speaker group sound model data MD3.

Furthermore, the processing in the recognition mode explained above is the processing when a registration word is registered. However, the same recognition processing is possible even when a registration word is not registered. In this case, the registration word data RD101 is not created, so the speech recognition is performed using the specific speaker group sound model data 92.

Figure 6:
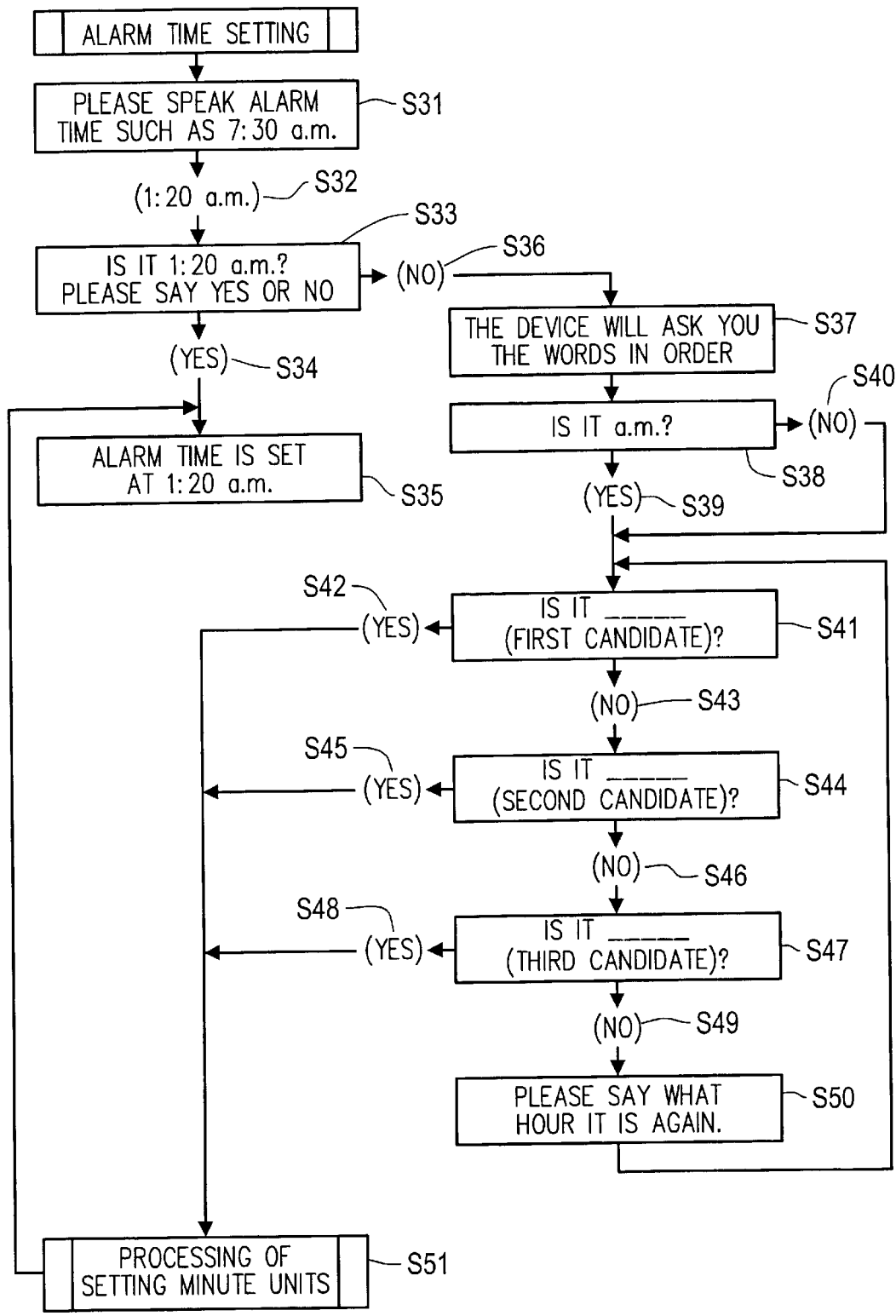
FIG. 6 is a state flowchart explaining the recognition processing of three continuous words ("a.m.", "1 o'clock", "20 minutes") in one embodiment of this invention.

A conversation example between the speaker and the device when alarm time setting is performed is next explained with reference to the flowchart of FIG. 6. In FIG. 6, the speaker content within the parenthesis is the content of the words spoken by the speaker who uses the device. Furthermore, the device prompts the speaker to speak by listing content examples to be spoken such as "Please speak the alarm time such as a.m., seven o'clock, thirty minutes" (step s31). By so doing, the speaker (speaker number 1 here) speaks "a.m.", "1 o'clock" and "twenty minutes" as a desired time to be set (step s32).

In the conversation content here, three words are considered as one set, such as "a.m.", "1 o'clock" and "twenty minutes", and the words are continuously spoken with small intervals between each word. Furthermore, on the device side, speech recognition is continuously performed with respect to the respective words. As the recognition result, the device responds to the speaker by saying "Is it 1:20 a.m.? Please answer yes or no" (step s33).

If this recognition result is correct, speaker number 1 responds to the device by saying "yes" (step s34). The device then speaks a conversation content such as "The alarm time is set at 1:20 a.m." (step s35). On the other hand, if the recognition result is incorrect, speaker number 1 responds to the device by saying "no" (step s36), and the device responds to the speaker by saying "The device will ask you in order" (step s37).

Furthermore, first of all, the device speaks to the speaker by asking "Is it a.m.?" to confirm whether it is "a.m." or "p.m." (step s38).

In response, speaker number 1 says "yes" if a.m. is correct (step s39). If it is incorrect (if it is not a.m.), the speaker responds to the device by saying "no" (step s40). Because "a.m." and "p.m." are mutually exclusive, if speaker number 1 responds to the device by saying "no", the other word can be confirmed. That is, the first inquiry from the device is "a.m.", and the speaker responds to the device by saying "no", "p.m." is confirmed.

In addition to "a.m." and "p.m.", for example, if "noon" is added, among "a.m.", "p.m." and "noon", if one of them needs to be confirmed, for example, "noon" is confirmed if the device states. "Is it a.m.?", the speaker says "no", the device says "Is it p.m.?", and the speaker says "no". Thus, if there are only three words, by repeating the response of "yes" or "no" from the speaker two to three times, it is possible to confirm a desired word in a short period of time.

When the confirmation of "a.m." or "p.m." is thus performed, next, the "hour" unit is confirmed. In this case, the word which has been input by the speaker number 1 is "1 o'clock". In response to this, for example, if the device speaks "Is it 1 o'clock?" as a first candidate in step s41 among first through nth recognition candidates for "1 o'clock", speaker number 1 responds to the device by saying "yes" (step s42), and if "1 o'clock" is confirmed, the confirmation processing of minute unit begins (step s51).

However, for example, if "seven o'clock" is output from the device side in step s41 as the first candidate, speaker number 1 responds to the device by saying "no" (step s43). By so doing, the second candidate is output from the device (step s44), and, for example, if "eight o'clock" is output as the second candidate, if it is correct, speaker number 1 responds to the device by saying "yes" (step s45). If it is incorrect, speaker number 1 responds to the device by saying "no" (step s46).

Here, because the response is "no", for example, the device outputs "1 o'clock" as a third candidate (step s47). If it is correct, the speaker number 1 responds to the device by saying "yes" (step s48). If it is incorrect, the speaker number 1 responds to the device by saying "no" (step s49). Here, because the speaker number 1 responds to the device by saying "yes", "1 o'clock" is confirmed at that point and the confirmation processing of the minute unit (step s51) begins.

Furthermore, if the response is "no" for the third candidate, the device prompts speaker number 1 by saying, for example, "Please say what time it is again." Thus, the device asks the speaker to input the sound of "hour" unit (step s50). By so doing, the speaker number 1 speaks the hour unit again ("1 o'clock" in this case), and the program returns to step s41.

Additionally, when the sound input is performed with respect to "hour" unit and is recognized, the words ("seven o'clock", "eight o'clock", or the like in the case discussed earlier) denied by saying "no" are removed from the recognition candidates.

Furthermore, the "minute" unit can be performed in the same processing as steps s31–s50 explained in "hour" unit. When it is finally confirmed, the device announces "the alarm time is set at 1:20 a.m." (step s35).

This type of processing can be performed in the same manner for the current time setting, in addition to the alarm setting.

Additionally, when the first candidate is rejected by the speaker in the processing described earlier, for example, the device can speak in accordance with an order of numbers which express time, and which is not related to the recognition candidate order, instead of speaking the recognition candidate order such as the second candidate and the third candidate, for example, when "1 o'clock" is rejected, the device can speak times in the order of two o'clock", "three o'clock", etc.

By performing this type of processing, in the case of time setting, the speaker can continuously speak sounds such as "a.m.", "o'clock", and "minute" as one group. By so doing, the sound inputting operation for the time setting can be simplified. Furthermore, if the series of sounds is correctly recognized, the time setting is completed at that time. If it is incorrect, words are confirmed one by one until the sound is correctly recognized. Therefore, the correct time setting can ultimately be performed, and the time setting can be performed reliably and conveniently.

In addition to time, this type of processing which recognizes continuous words can be broadly applied to cases where sound formed of a plurality of words which is continuously spoken with small intervals between words is recognized.

Figure 7:
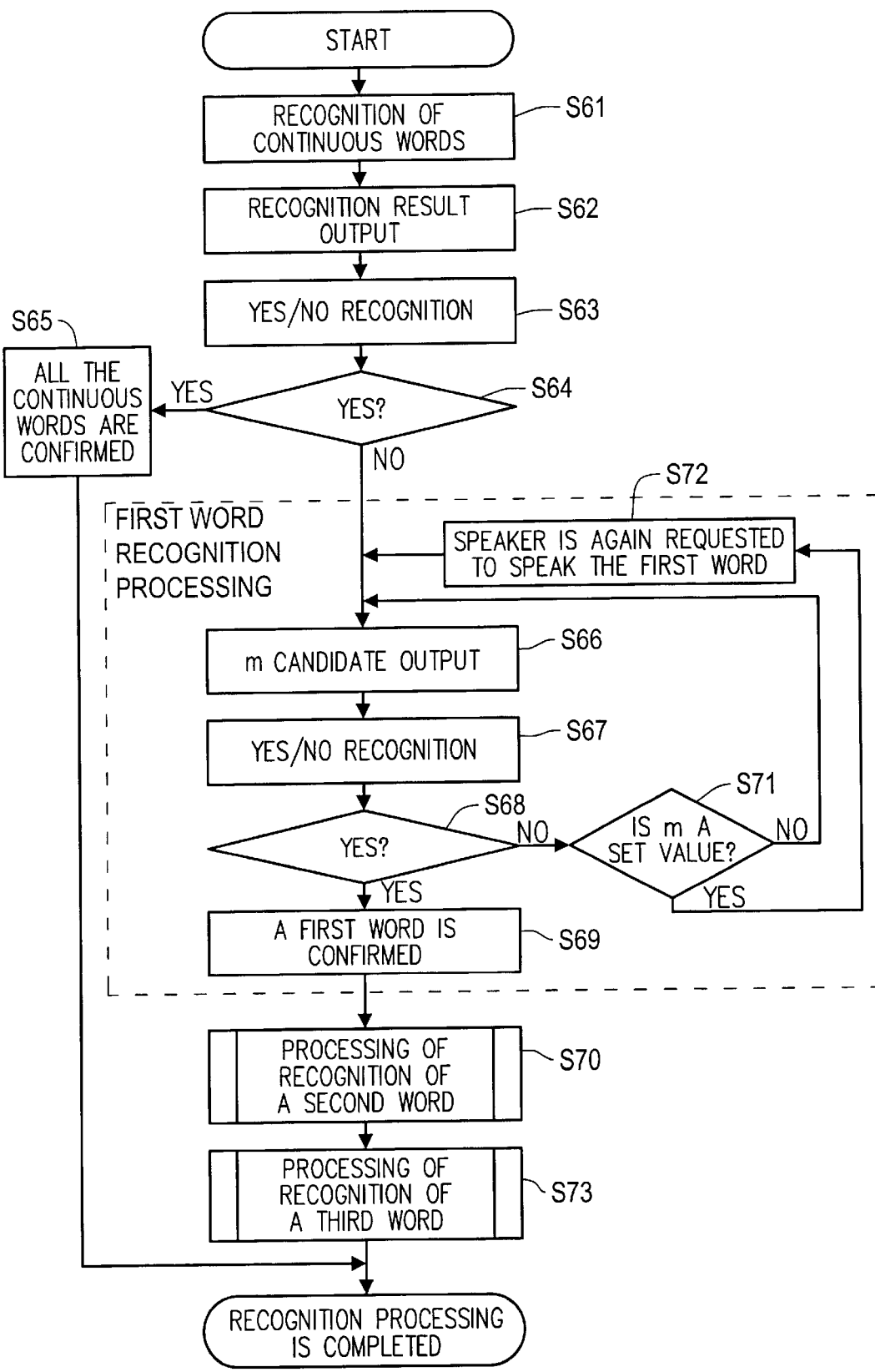
FIG. 7 is a flowchart explaining the processing procedure when the recognition processing of three words shown is applied as a general continuous word recognition processing.

FIG. 7 is a flowchart explaining a processing procedure when sound formed of a plurality of words, i.e., n words from first through nth, is continuously spoken with small intervals between words is recognized (defined as continuous word recognition here). The processing procedure shown in FIG. 7 is briefly explained. Here, as n continuous words, there are three words (a first word, a second word, and a third word). Furthermore, when recognition for a first word, a second word, and a third word is respectively performed, m recognition candidates are output, with m having the values from 1 through 3 here.

In FIG. 7, first of all, recognition is performed for continuous words consisting of a plurality of words spoken by the speaker (step s61). Furthermore, the recognition result is output (step s62), and the recognition of "yes" or "no" is performed from the speaker with respect to the recognition result (step s63). Here, if the response of the speaker is "yes" (step s64), the recognition result is confirmed for all the continuous words (step s65), and the recognition processing is completed at this point.

Meanwhile, if the response of the speaker is "no", recognition processing of the first word begins. The recognition processing of this first word outputs an mth candidate (m=1 here) (step s66), and "yes" or "no" of the speaker is recognized (step s67). Here, if the response of the speaker is "yes" (step s68), the first candidate is confirmed as the first word (step s69), and the processing for the second word begins (step s70).

Meanwhile, if the response of the speaker is "no", it is determined whether m is a set value (the set value is m=3 in this case) (step s71). Here, because it is not yet the set value, the processing returns to step s66, and the second candidate is output as m=2 this time.

Furthermore, "yes" or "no" of the speaker is recognized (step s67). Here, if the response of the speaker is "yes" (step s68), the second candidate is confirmed as this first word (step s69), and the processing for the second word begins (step s70). Furthermore, if the response of the speaker is "no", the determination step s71 is performed.

Thus, if the response of the speaker is "yes", the first word is confirmed by the recognition candidate at that point. However, if the response of the speaker is "no", the same processing is performed for the following recognition candidate. Furthermore, in this case, if the word is not correctly recognized for the third candidate, the device requests the speaker to speak the first word one more time (step s72). The speaker then repeats the same operation for the first word spoken by the speaker.

Additionally, as explained in the example of FIG. 6 described earlier, the sound input is performed as the speaker speaks the first word again, and when the sound is recognized, the words which have already been rejected by "no" are removed from the recognition candidates.

When the recognition processing for the first word is thus completed, next, the recognition processing (step s70) for the second word begins. When the recognition processing for the second word is completed, next, the recognition processing for the third word (step s73) begins. Furthermore, the recognition processing for the second and third words is the same as the recognition processing of the first word, so the explanation is omitted here.

Incidentally, when the sound inputting operation as described above is performed, the distance between the speaker and the sound inputting part (microphone) of the device side is an important factor in terms of the recognition capability. Here, in this embodiment, according to the situation of the sound inputting operation of the speaker, the sound inputting gain of the sound inputting part, that is, the sound inputting gain of the microphone amplifier 2, is changed and controlled. This controlling, in addition to the controlling of the various processing described earlier, is performed in the controller 5. Hereafter, this controlling is explained.

The sound inputting gain (hereafter referred to as gain) controlling of this microphone amplifier 2 determines the scene type in which the sound inputting is being performed, and the gain is controlled according to the scene.

For example, it is determined whether a sound which requires a particularly high recognition percentage in the operation of device, or some other sound, is input. If sound which requires particularly high recognition percentage in the operation of the device is input, controlling is performed such that the sound inputting gain can be minimized, compared to a scene where some other sound is input.

Specifically, when the characteristic amount of the sound is mutually similar between a plurality of words is input, and the sounds of the words are easily misrecognized, when the word registration is performed, and when the speaker learning is performed, control is performed such that the sound inputting gain can be minimized.

When sounds for words which are easily misrecognized are input, in the case of this device, when the alarm time or the current time is set, the scene where the time inputting (a.m., o'clock, and minute) is considered. With respect to this type of time setting, there are many sounds in which the characteristic amount of the sound is similar and is easily misrecognized, such as "five o'clock" and "nine o'clock". Furthermore, the time setting must be accurately performed.

Therefore, when this type of sound inputting is performed, the gain of the microphone amplifier 2 is minimized, and the speaker approaches the microphone and speaks words.

Meanwhile, in a scene where the speaker calls out to the device, the gain can be maximized and sound input is possible even if the speaker is distant from the device. This is convenient when conversation is carried out between the speaker and the device when the speaker is distant from the device.

In this type of scene where the gain is maximized, words (words which belong to the word set w1) which have been registered such as "good morning", "I'm home", "good night", "o'clock", and "alarm" are input. In this case, compared to the time information (word sets w2 and w3) described above, the words input in this type of scene are not easily misrecognized among other words which belong to the same word set w1. In this case, there are also not many recognition target words because there are only a certain number of words. Furthermore, because the speaker casually speaks to the device, it is preferable to use a method in which the words can be input at a distance from the device by maximizing the gain.

Thus, depending upon the scene type where the respective word is input, a sound inputting gain is set which is appropriate to the scene.

When sound for a word that is easily misrecognized is input, when word registration is performed, and/or when speaker learning is performed, as described above, the gain of the microphone amplifier 2 is minimized, and the speaker speaks near the microphone 1. Therefore, the distance between the speaker and the microphone 1 does not vary much from speaker to speaker, and there are many cases that the distance is virtually the same. Therefore, the S/N ratio is improved, the dynamic range is minimized, and the conversation content in this situation can be recognized with a high recognition percentage.

Thus, the gain of the microphone amplifier 2 is controlled depending upon the situation where the sound input is performed. In order to perform the sound input in response to the situation, some sort of notification is sent from the device side. As the notification content, for example, "Please come close to the microphone and speak", "Please speak loudly", or "Please speak softly" can be listed, and these contents can be output from the device side.

The controller 5 can find out what type of sound input is being performed with respect to a current sound input (for example, whether the speaker is simply calling out to the device, a registration word is being input, time setting is being performed, or the like). Therefore, according to the situation, it is possible to change and control the gain of the microphone amplifier 2, and to output content that causes the speaker to speak according to the gain of the microphone amplifier 2.

For example, when sound for the word that is easily misrecognized is input, when word registration is performed, and/or when the speaker learning is performed, the gain of the microphone amplifier 2 is minimized, and content such as "Please come close to the microphone and speak again" is output from the device. By so doing, the speaker naturally approaches the microphone and speaks, the S/N ratio is improved and the dynamic range is minimized, so the recognition capability can be improved.

Figure 8:
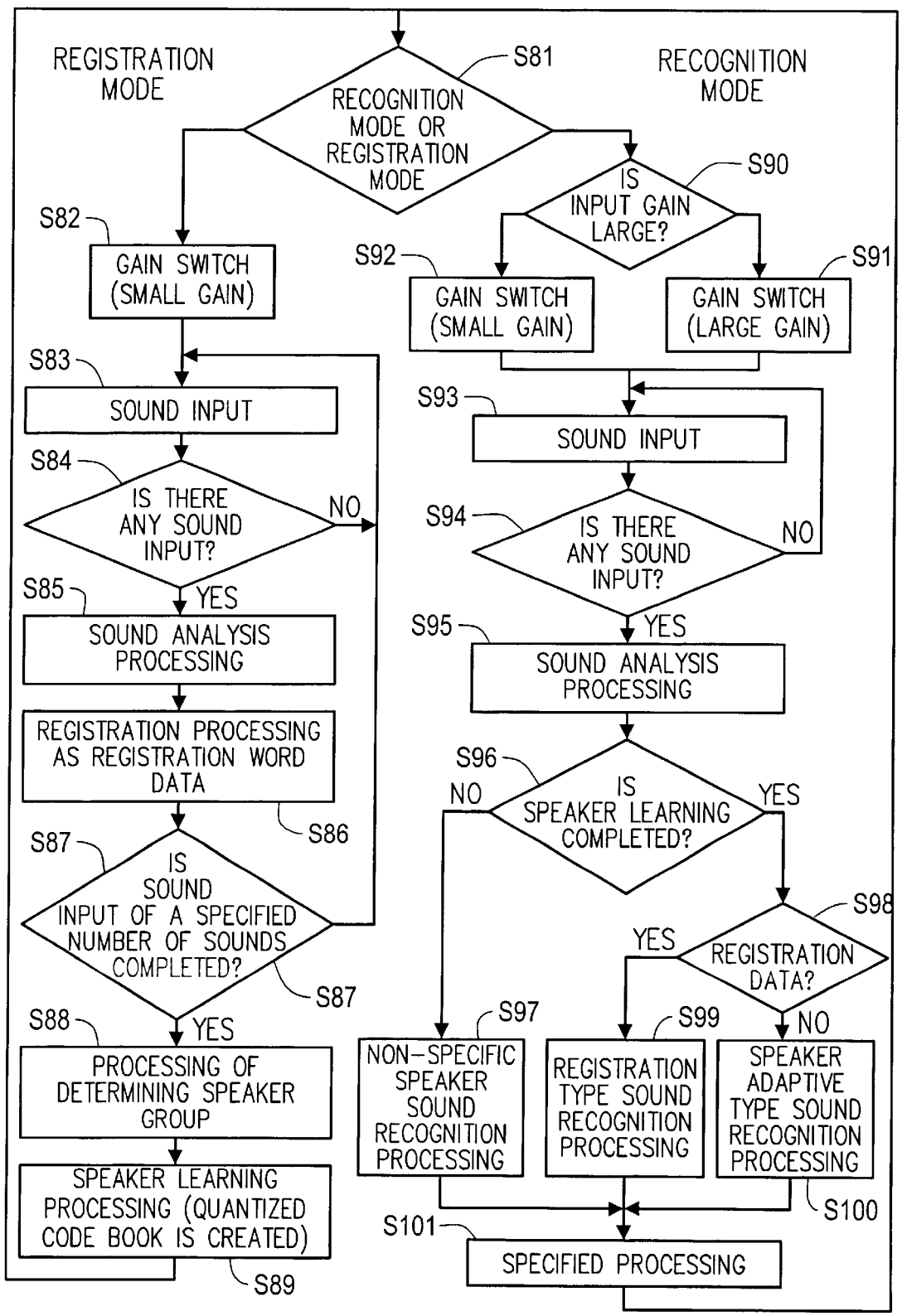
FIG. 8 is a flowchart explaining the processing procedure including a gain change of a microphone amplifier according to the situation of the sound inputting operation of the speaker.

FIG. 8 is a flowchart explaining an example of performing control to change the gain of the microphone amplifier 2 according to the situation of the sound inputting operation of the speaker explained above. Here, the example is explained of changing the gain when the processing of FIG. 4 described above, is performed.

In FIG. 8, it is determined whether the recognition mode or the registration mode is required (step s81). In this determination, if it is the registration mode, the gain change is performed so that the gain of the microphone amplifier 2 is minimized (step s82), and the sound input is performed with the changed gain (step s83). Step s83, which performs this sound inputting, through step s89 of the speaker learning processing is the same as step s12 of FIG. 4, which performs the sound inputting, through step s18 of the speaker learning processing, so the explanation is omitted here.

Meanwhile, when the recognition mode is required, the gain of the microphone amplifier 2 is changed according to the scene. For this change, it is determined whether the scene where the sound inputting is performed is a scene where the gain is maximized (step s90). In the case of a scene where the gain is maximized, a gain change is performed so that the gain of the microphone amplifier 2 is to be maximized (step s91). In the case of a scene where the gain is to be minimized, a gain change can be performed so that the gain of the microphone amplifier 2 is minimized (step s92).

Furthermore, a scene where the gain is to be maximized in step s90 is a scene where sound inputting such as an inquiry is performed. Meanwhile, a scene where the gain is to be minimized is a scene where a registration word is input, or cases such as the time input (a.m., o'clock, and minute) in the case of alarm setting and the current time setting, where the possibility of misrecognizing is high and particularly high recognition percentage is desired.

Thus, according to the scene at that time, gain setting is performed and the sound inputting is performed (step s93). The sound inputting (step s93) through the specified processing (step s101) is the same as the sound inputting (step s19) of FIG. 4 through the specified processing (step s27), so the explanation is omitted here.

Additionally, when a device receives this type of the command by sound and performs an operation in response to the command, there are many cases when a speaker with low recognition percentage and a speaker with good recognition percentage exist, depending upon the characteristics of the speaker's way of speaking and the sound quality of the speaker.

Thus, for a speaker with a particularly bad recognition percentage, the conversation content is output from the device side in a question-and-answer format. As the speaker listens to the content, he/she operates a button which means affirmative when he/she means affirmative, and operates a button which means negative when he/she means negative. Therefore, the same type of operation can be performed in order to recognize "yes" or "no".

That is, the device outputs candidates one by one in order in a question-and-answer format as the setting information for the information which the speaker would like to set for the device (defined as setting information). Every time one candidate is output, the input of a button which means affirmative for the output candidate, or the input of the button which means negative for the output candidate, is received. When the input of button which means affirmative is received, the candidate is confirmed as the setting information, and when the input of the button which means negative is received, the following candidate is output.

Thus, enabling the input of affirmative or negative by this button operation is to help a speaker with a bad recognition percentage. This is called a help mode. Hereafter, this help mode is explained.

In the operating part 11 of the device, a negative button BT22 which means negative and an affirmative button BT21 which means affirmative are disposed. That is, when the affirmative button BT21 is pressed by the speaker, the controller 5 determines that it is affirmative. When the negative button BT22 is pressed, the controller 5 determines that it is negative.

Furthermore, in order to carry out the help mode, by simultaneously pressing the affirmative button BT21 and the negative button BT22 for several seconds (approximately 2 seconds) or more in the ordinary recognition mode explained above, for example, the controller 5 detects the status, determines that the setting of the help mode has been performed, and shifts to the help mode. Additionally, the shift to this help mode is not limited to the condition where the affirmative button BT21 and the negative button BT22 are simultaneously pressed for several seconds or more, so that other methods are also acceptable.

When the help mode thus begins, the device does not perform the speech recognition operation, but detects whether the speaker has pressed the negative button BT22 or the affirmative button BT21, and the corresponding processing proceeds.

Figure 9:
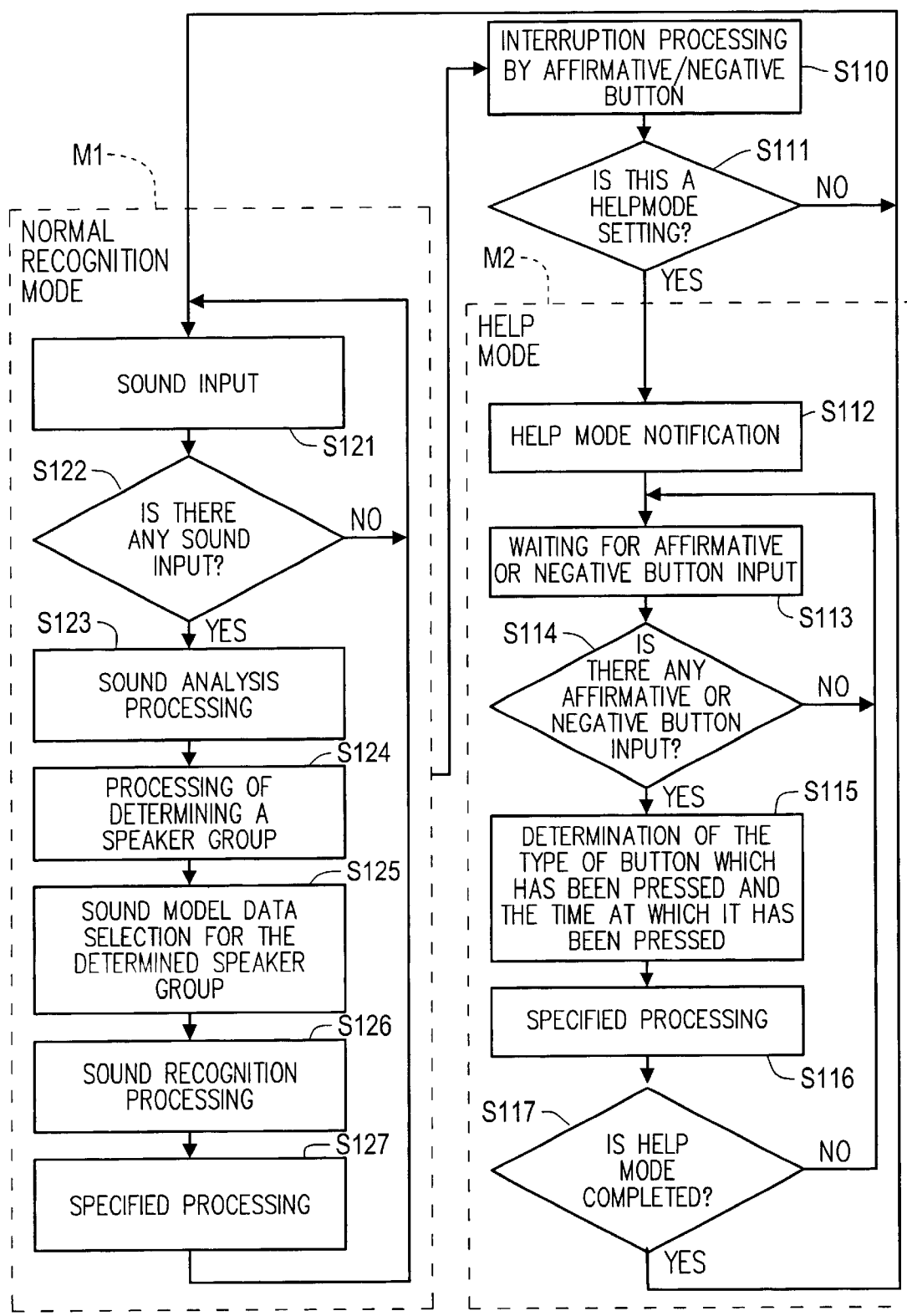
FIG. 9 is a flowchart explaining a speech recognition processing procedure provided with a help mode.

FIG. 9 is a flowchart explaining the recognition processing when the help mode is provided. In FIG. 9, M1 is a processing procedure during the ordinary recognition mode, M2 is a processing procedure during the help mode, and the shift from an ordinary recognition mode M1 to the help mode M2 is performed by a button interruption (step s110) in which the affirmative button BT21 and the negative button BT22 are simultaneously pressed for several seconds (approximately 2 seconds) or more. Furthermore, the processing from the sound input (step s121) in the ordinary recognition mode M1 to the specified processing (step s127) shown in FIG. 9 is the same processing as steps s1–s7 shown in FIG. 2, so the explanation is omitted here.

Now, assume that recognition is being performed in the ordinary recognition mode, and that, in this ordinary recognition mode, interruption by the affirmative button BT21 and the negative button BT22 occurs (step s110).

By so doing, it is determined whether the setting of the help mode has been performed (step s111). If it is the setting of the help mode, the status of the help mode is notified to the speaker (step s112). Furthermore, for the setting of the help mode by step s112, here, it is determined whether the affirmative button BT21 and the negative button BT22 are simultaneously pressed for several seconds (approximately 2 seconds) or more.

When the shift to the help mode M2 is thus performed, the device is placed in a state of awaiting input of the affirmative button BT21 or the negative button BT22 (step s113). It is determined whether the affirmative button BT21 or the negative button BT22 is pressed (step s114), and whether the pressed button is the affirmative button BT21 or the negative button BT22, and/or how long the pressed state continues (step s115). The corresponding specified processing is then performed (step s116).

For example, the candidates for the information which the speaker wants to set for the device are output one by one from the device in a question-and-answer format to ask the speaker whether the input is correct. Every time one candidate is output, the input of the affirmative button BT21 or the negative button BT22 is received with respect to the output candidate. When the input of the affirmative button BT21 is received, the candidate is confirmed as the setting information, and when the input of the negative button BT22 is received, the following candidate is output. Furthermore, the specific processing content is explained later.

Next, it is determined whether the help mode is completed (step s117). If it is not completed, the processing returns to step s113. If it is completed, the processing returns to the ordinary recognition mode M1.

Figure 10:
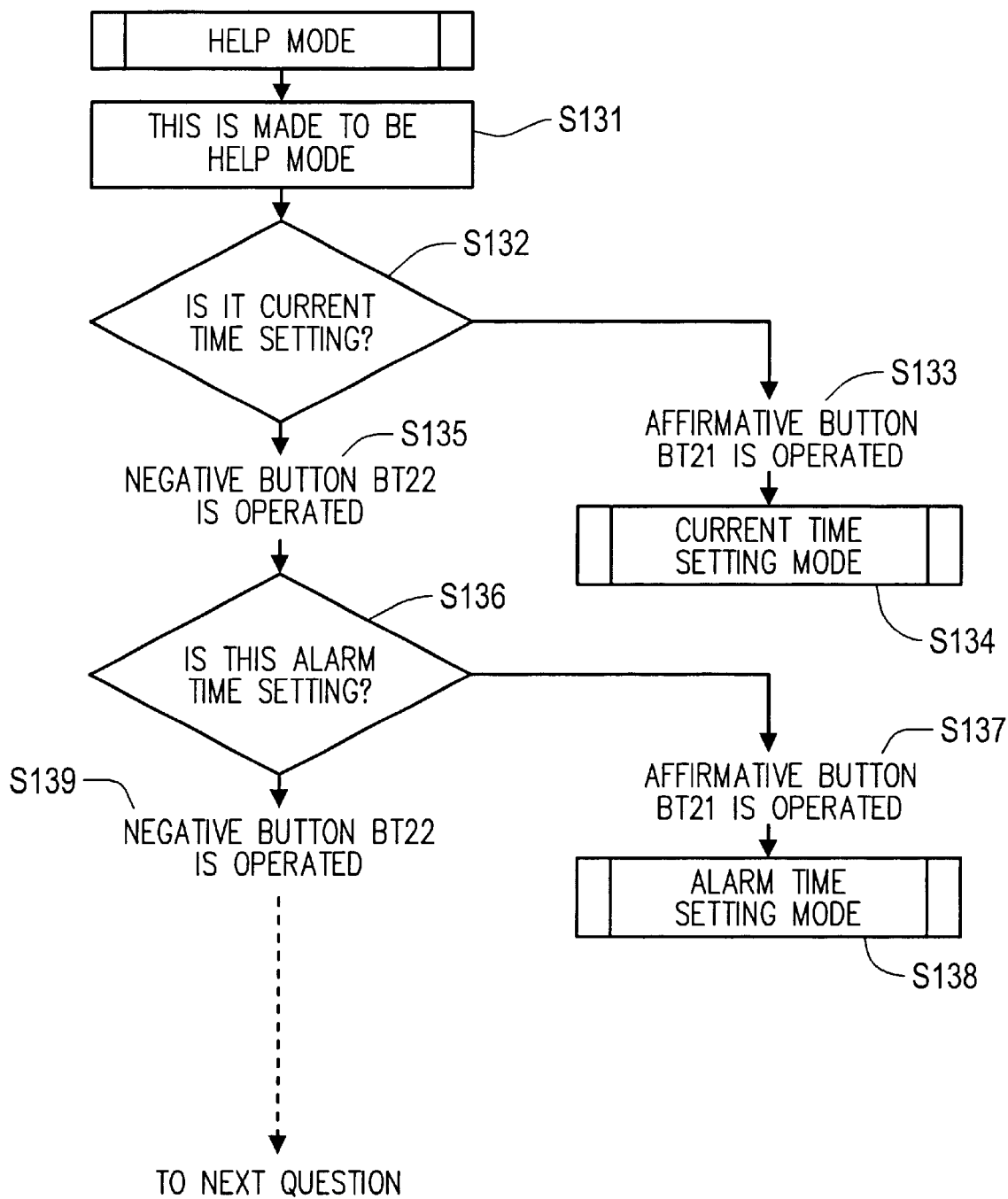
FIG. 10 is a state flowchart explaining the help mode (the input mode of "yes" and "no" by a affirmative button and a negative button) in one embodiment of this invention with respect to the speech recognition processing.

The following explains a specific operation example with reference to a state flowchart of FIG. 10. Furthermore, the operations within parentheses in FIG. 10 are operations performed by a speaker.

First of all, the device notifies the speaker of the help mode such as "The help mode is now active" (step s131). Subsequently, the device speaks the information which the speaker would like to set for the device, such as "Is this current time setting?" (step s132). When the speech content is affirmed by the speaker, the affirmative button BT21 is pressed (step s133), and by so doing, the current time setting mode begins (step s134).

Furthermore, if it is not the current time setting, the negative button BT22 is pressed (step s135). When this happens, the device speaks content such as "Is this alarm time setting?" (step s136). When the speech content is affirmed by the speaker, the affirmative button BT21 is pressed (step s137), and by so doing, the alarm time setting mode begins (step s138). Furthermore, if it is not the alarm time setting, the negative button BT22 is pressed (step s139).

Thus, with respect to the one-by-one questions from the device, the speaker presses the affirmative button BT21 or the negative button BT22 instead of responding to the device by saying "yes" or "no". Through this, the device proceeds with the processing according to the button operation. The question content includes, for example, "Would you like to perform a registration word input?" in addition to the two question contents explained above, but description concerning the processing for such other contents is omitted in FIG. 10.

Furthermore, if the affirmative button BT21 and the negative button BT22 are erroneously operated, the processing returns to the previous question by instantly simultaneously operating the affirmative button BT21 and the negative button BT22.

The current time setting mode (step s134) mentioned earlier is briefly explained. For the current time setting using the affirmative button BT21 or the negative button BT22, the device asks whether it is "a.m. If the speaker presses the affirmative button BT21 in response, a.m. is confirmed, and if the negative button BT22 is pressed, "p.m." is confirmed.

After a.m. or p.m. is confirmed, the device first asks a question such as "Is it 1 o'clock?". If the hour unit which the speaker would like to set is "one", the affirmative button BT21 is pressed, and 1 o'clock is confirmed. Furthermore, if it is not 1 o'clock, the negative button BT22 is pressed. When this happens, the device asks a question to the speaker such as "Is it two o'clock?". If the hour unit is "two" which the speaker would like to set, the affirmative button BT21 is pressed, and two o'clock is confirmed by so doing. Furthermore, if it is not two o'clock, the negative button BT22 is pressed.

This type of procedure is performed until the hour unit is confirmed. Additionally, when the hour unit is confirmed, the processing of the minute unit begins.

The operation of the minute unit is basically the same as the operation of the hour unit described earlier. Therefore, the explanation is omitted here. However, operation could be troublesome if every minute such as one minute through fifty-nine minutes is spoken one by one, and this is time-consuming. In particular, if the minute unit the speaker would like to set is toward the end of the minute units (for example, fifty-nine minutes), this is very time-consuming.

Therefore, in the case of the minute unit setting mode, it is also acceptable to use a method such that, if the negative button BT22 continues to be pressed, the device outputs a sound such as "10 minutes", (1 second later), "20 minutes", (1 second later) "30 minutes", and so forth. When the device speaks "50 minutes", if the speaker stops the operation of the negative button BT22, the processing returns to the ordinary operation, with a base point of 50 minutes. When the device speaks "51 minutes", the negative button BT22 is pressed. Next, when the device speaks "52 minutes", the negative button BT22 is pressed again. This sort of processing continues until 59 minutes is set by pressing the affirmative button BT21 at "59 minutes".

As explained above, there are cases where time setting can be time-consuming. In order to shorten the time required for setting as much as possible, the input of the affirmative button BT21 and the negative button BT22 is received even during the sound output from the device. In addition, in order to improve the convenience, a setting can be made such that a function corresponding to the way of pressing the affirmative button BT21 and the negative button BT22 (continuous pressing, simultaneous pressing, or the like) is performed, and/or such that instructions on how to use the device are given by sound from the device.

Thus, when the speaker speaks the information which the speaker would like to set for the device (setting information), if the setting information is not correctly recognized by the device, by setting the help mode, candidates for the setting information can be output one by one in order from the device in a question-and-answer format. Every time one candidate is output, if the input of the affirmative button BT21 is received, the candidate is confirmed as the setting information, and when the input of the negative button BT22 is received, the following candidate is output. Therefore, the information which the speaker would like to set for the device can be set by the button operation.

By so doing, even if the sound is not properly recognized due to the characteristics of the speaker's way of speaking and/or the voice quality of the individual speaker, information setting such as the time setting can be sufficiently performed to some degree. Furthermore, it is also possible for the speech impaired to easily perform the time setting.

Incidentally, in the sound clock device in this embodiment explained above, when the current time reaches the alarm time which the speaker sets, until the speaker stops the alarm, the device continues to output the current time. For example, the set alarm time is 1:20 a.m., and if the time reaches that point, the device says "1:20 a.m.", and after one minute passes, the alarm says "1:21 a.m.". Furthermore, after one minute passes, the device says "1:22 a.m." Therefore, the current time can be spoken minute by minute. This operation continues until the speaker stops the alarm. Additionally, the current time can be spoken, for example, per ten seconds instead of per one minute.

Furthermore, when the alarm is spoken, words such as "Hurry and get up!" can be output instead of time only, and/or a combination of words and music.

As the operation to stop the alarm, there are methods such as, after the time as described earlier is spoken from the device, the speaker can speak some sort of sound, or methods in which buttons are operated, or the like.

When the alarm is stopped by a sound spoken by the speaker, the alarm stops when the level of the sound input by the speaker a specified level or more, and when this level of a specified level or more is of a certain length. Furthermore, at this point, speech recognition is not performed. Additionally, separately from this, it is also possible to stop the alarm only when a specified word, which is predetermined by the speaker, is spoken and the sound is recognized by the device. Furthermore, if the alarm is stopped by a button operation instead of inputting sound, it is possible to provide a special button, but the affirmative button BT21 and/or the negative button BT22 described earlier can be substituted.

Furthermore, when the volume adjustment switch VSW is provided, the alarm can be stopped by turning off the volume adjustment switch VSW.

The volume adjustment switch VSW is a switch which adjusts the volume of the sound output from the device. The sound outputting amplifier 7 is controlled by adjusting the volume adjustment switch VSW through the operating part 11. Therefore, the volume of the output sound can be set. As a specific example of the volume adjustment, for example, it is possible to change and set the output sound, such as at "maximum", "medium" and "minimum". Furthermore, it is also possible to turn "off" so that no sound is output.

If the device with this type of speech recognition function is used at home, this type of volume switch prevents the sound clock from generating unnecessary sound in response to sounds from television and conversations between people in the home. Furthermore, if the volume adjustment switch VSW is turned off, in order to reduce electricity consumption, by stopping the power supply to the surrounding circuitry such as the amplifier, the controller (CPU) 5 can be in a sleep state. Furthermore, when the volume adjustment switch VSW is turned on, the CPU 5 is operated by a CPU interruption, and power is supplied to the surrounding circuitry.

Furthermore, in the embodiment of this invention, a plurality of response contents to the sound input by the speaker can be prepared, and randomly changed and output. Thus, the system does not become mundane to the user. For example, a plurality of response contents with which the device responds when the speaker inputs "good morning" is prepared, and a response content among the plurality of response contents for "good morning" can be selected at random and output.

By so doing, the user can be more creative if he/she uses the device for a long period of time.

Additionally, this invention is not limited to the embodiment explained above, and can be modified in various ways within the scope of the main features of this invention.

As an example, several words are selected as registration words among a plurality of recognizable words, the respective registration words are spoken by the recognition target speaker, and registration word data is created for the respective registration words from the sound data and is saved. When a registration word is spoken by the recognition target speaker, the sound is recognized using the registration word data, and when other recognizable words are spoken, when the processing is realized by recognizing the sound using standard speaker sound model data, in the embodiment described above, as shown in FIG. 1, the recognition target speaker can be focused into the area which is set in advanced based upon age and gender. Specific speaker group sound model data 92 (forming first through third specific speaker group sound model data MD1, MC2, and MD3) is created from the sound data of many non-specific speakers who belong to the area, and is saved as standard speaker sound model data. However, the invention is not limited to this example, and as shown in FIG. 11, it also applies to cases where conventionally-used standard speaker sound model data, corresponding to all types of speakers, is used.

Figure 11:
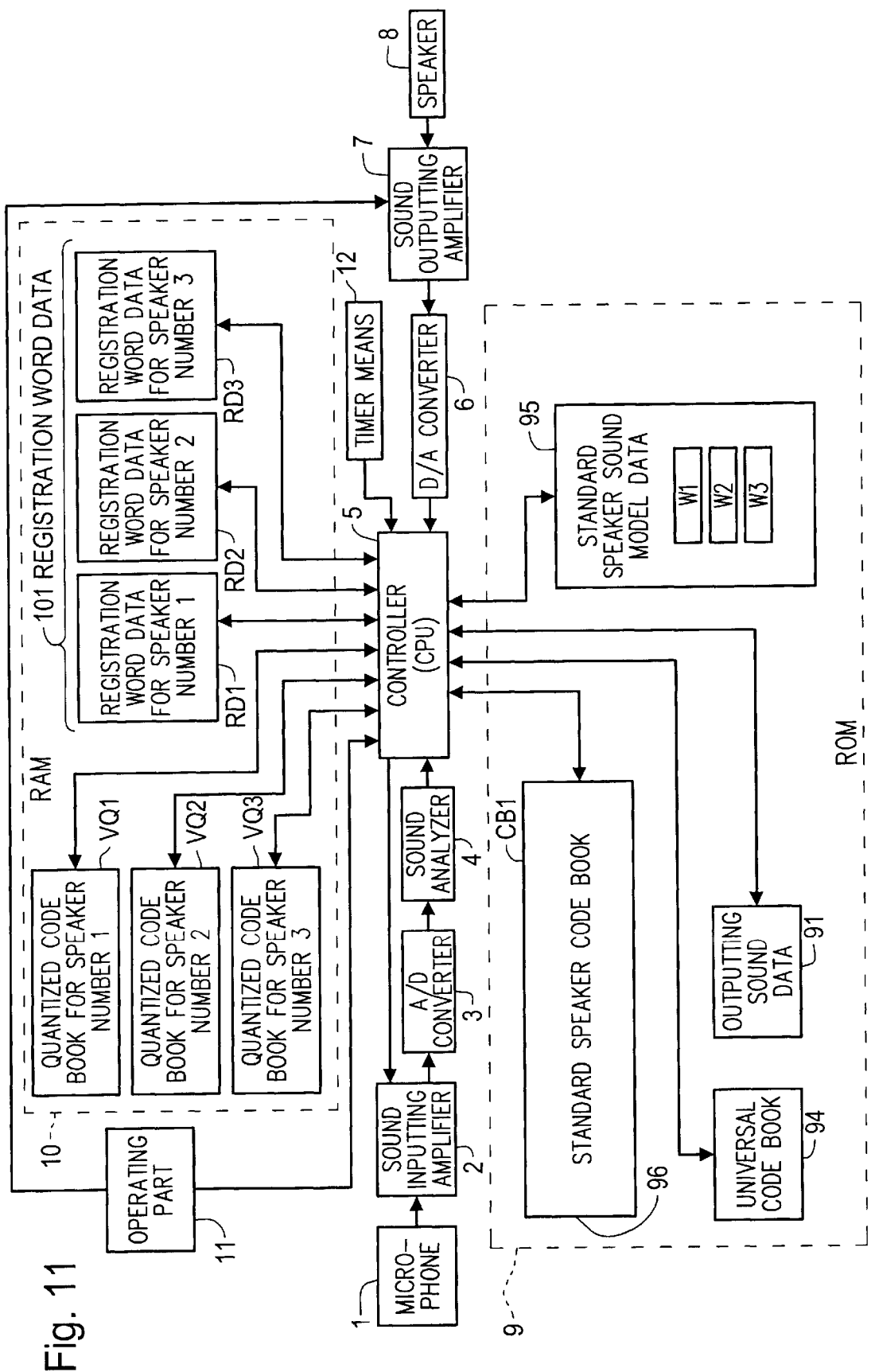
FIG. 11 is a block diagram explaining the structure of another exemplary embodiment of the speech recognition device of this invention.

As described earlier, the standard speaker sound model data 95 shown in example of FIG. 11 is not sound model data corresponding to a specific speaker group, but is standard speaker sound model data corresponding to all ranges of speakers. Along with this, the first through third specific speaker group code books CB1, CB2, and CB3 shown in FIG. 1 become standard speaker code books 96 which have been created based on the standard speaker sound model data 95.

Other processing procedures are the same as in the case of FIG. 1, so the explanation is omitted here.

Even in this type of structure, the basic processing which this invention performs is possible. That is, when several words are selected as registration words among a plurality of recognizable words, a recognition target speaker speaks the respective registration words, the registration word data RD1, RD2, and RD3 for the respective registration words is created from the sound data and is saved in RAM 10. When a registration word is spoken by a recognition target speaker, the sound is recognized using the registration word data RD1, RD2, and RD3, and if other recognizable words are spoken, the sound is recognized using the standard speaker sound model data 95.

In addition, the sound clock shown in the above-described embodiment can also have various functions as explained in the embodiment described above. However, these functions are not all necessary. Therefore for the various switches and operating buttons disposed in the operating part 11, it is only necessary to provide the buttons necessary to activate the functions. Furthermore, various processing contents explained in the embodiment described above are not limited to the contents explained in the embodiment. For example, as the speaker learning processing, in the embodiment described above, the quantized code books VQ1, VQ2, and VQ3 are created using the universal code book 94, and speaker adaptation as performed using these quantized code books when sound is recognized. However, this is not limited to this example, and speaker adaptation can be performed using a mapping function which has been created from the registration word data RD1, RD2, and RD3 and the first through third specific speaker group sound model data MD1, MD2, and MD3. Furthermore, speaker adaptation is possible using an inputting speaker code book (a code book before vector quantization using the universal code book 94) which has been created by the mapping function and the first through third specific speaker group code books CB1, CB2, and CB3.

Furthermore, in the embodiment described above, this is an example where speakers (speaker numbers 1, 2, and 3) who belong to a plurality of speaker groups use one device. Therefore, a specific speaker group sound model data is provided as corresponding first through third specific speaker group sound model data MD1, MD2, and MD3. However, depending upon the type of the device, there are cases that only speakers (for example, children) who belong to the same speaker group are the users of the device. In this case, the specific speaker group sound model data can provide the corresponding specific speaker group sound model data only. According to this, the capacity of the ROM 9 can be significantly reduced, processing ability of the controller 5 can be small, the capacity of the RAM 10 can be small, and the cost of the entire device can be significantly reduced.

In the embodiment described above, an example is given in which the setting of various modes is performed by various buttons disposed in the operating part or the like, but it is also possible to set by sound only, instead of disposing buttons.

Furthermore, the processing program which performs the processing of this invention described above can be recorded on a recording medium such as a floppy disk, an optical disk, or a hard disk. This invention also includes the recording medium. In addition, it is also acceptable to obtain the processing program from a network.

As explained above, in this, invention, all of the continuous words which have been input are recognition processed, the recognition result of all of the continuous words are output, a response from the speaker showing affirmative/negative of the recognition result (for example, "yes" or "no") is input and this "yes" or "no" is recognition processed. If the response from the speaker is determined to be affirmative ("yes"), the continuous words which have been input are confirmed by the recognition result. If the response is negative, for each word from a first to an nth (n is a positive integer) which structures the continuous words, the content from the speaker showing affirmative or negative is recognized in order, affirmative or negative is determined, and the recognition processing target word at that point is confirmed by the recognition result.

By so doing, the speaker can speak the continuous words all together and can easily perform a sound inputting operation. Furthermore, because the device performs speech recognition processing for all of the continuous words and the result is output, if it is correct, the recognition result of the continuous words at that point can be confirmed, and the corresponding following processing can begin. Therefore, effective processing is possible. Additionally, if the recognition result of any word among the continuous words is not correct, the recognition result of the respective words is output, affirmative/negative is determined in order for each of the words which structure the continuous words, and the recognition result for each word is confirmed so that confirmation processing of an accurate recognition result can be performed.

Additionally, with respect to one word, if a candidate which has been preset (mth candidate) is negative, speaking request is again output for the recognition processing target word and recognition processing is performed for the speaker so that confirmation of an accurate recognition result can be performed.

Furthermore, if a recognition processing target word is a mutually exclusive word, when one of two words is output as a recognition result, if the response from the speaker showing affirmative/negative is negative, the other word is confirmed as the recognition processing target word at that point. For example, if the recognition processing target word is "a.m.", it will be selected among "am." and "p.m.". Therefore, if the recognition result of "a.m." is negative, "p.m." is confirmed as the recognition result at the point. By also performing this type of processing, it is possible to effectively confirm a recognition result.

Thus, this invention is a continuous word recognition method with both convenience and accuracy. Therefore, significant effects can be seen by applying this invention to an interactive speech recognition device which recognition processes sounds for time setting such as "a.m.", "o'clock", and "minute" from the speaker as continuous word sounds, the recognition result is output as a sound, and if recognition is confirmed, sets the recognition result.

What is claimed is:

1. A continuous word recognition method for use in a speech recognition device, comprising:

recognition processing one or more continuously spoken words input by a speaker;

outputting the recognition processing result to the speaker;

prompting the speaker to confirm the recognition result;

receiving a response from the speaker indicating whether the recognition result is correct;

recognizing the response from the speaker; and determining whether the response indicates that the recognition result is correct such that if the recognition result is correct, the recognition result is confirmed and stored, and if the recognition result is not correct:

outputting the recognition result word by word from a first to an nth word, n being a positive integer, that form the one or more continuously spoken words;

prompting the speaker to confirm the recognition result of each word;

receiving the speaker's confirmation response after each word of the recognition result is output;

determining whether the response indicates that the recognition result of each word is correct such that if the recognition result is correct, the recognition result of each word is confirmed and stored, and if the recognition result for each word is not correct:

prompting the speaker to input another word;

confirming the recognition result for the another input word;

outputting at least one or more predetermined candidates in order, starting with a first candidate, with respect to a word which is a current processing target defined as a recognition target word, among the first to the nth words that form the continuous words;

inputting a response from the speaker indicating an affirmative/negative response per output candidate;

recognition processing the response;

confirming the output candidate as the recognition target word when the response of the speaker is determined to be affirmative;

outputting a following candidate when the response of the speaker is determined to be negative;

inputting the response from the speaker indicating an affirmative/negative response with respect to the output candidate;

recognition processing the affirmative/negative response;

confirming the output candidate as the recognition target word when the response of the speaker is determined to be affirmative;

repeating the outputting the following candidate step and the inputting the response step for the following candidates up to the an mth candidate if a negative response is determined;

outputting a request for the speaker to speak the recognition target word again when the response with respect to the mth candidate is determined to be negative;

outputting one of two words as a recognition result when a word among the first to the nth words that form the continuous words is a word which is mutually exclusive in terms of a meaning; and confirming the other word of the two words as a recognition result when the response from the speaker indicating an affirmative/negative response with respect to the output is negative.

2. A recording medium for storing programs for performing continuous word recognition, comprising:

a program for recognition processing one or more continuously spoken words input by a speaker;

a program for outputting the recognition processing result to the speaker;

a program for prompting the speaker to confirm the recognition result;

a program for receiving a response from the speaker indicating whether the recognition result is correct;

a program for recognizing the response from the speaker; and a program for determining whether the response indicates that the recognition result is correct such that if the recognition result is correct, the recognition result is confirmed and stored, and if the recognition result is not correct:

a program for outputting the recognition result word by word from a first to an nth word, n being a positive integer, that form the one or more continuously spoken words;

a program for prompting the speaker to confirm the recognition result of each word;

a program for receiving the speaker's confirmation response after each word of the recognition result is output;

a program for determining whether the response indicates that the recognition result of each word is correct such that if the recognition result is correct, the recognition result of each word is confirmed and stored;

a program for prompting the speaker to input another word if the recognition result for each word is not correct;

a program for confirming the recognition result for the another input word;

the program for outputting a following candidate and the program for inputting the response, being repeated for the following candidates up to an mth candidate if a negative response is determined;

a program for outputting one of two words as a recognition result when a word among the first to the nth words that form the continuous words is a word which is mutually exclusive in terms of a meaning; and a program for confirming the other word of the two words as a recognition result when the response from the speaker indicating an affirmative/negative response with respect to the output is negative.

3. The recording medium for storing programs as set forth in claim 2, further comprising:

a program for outputting at least one or more predetermined candidates in order, starting with a first candidate, with respect to a word which is a current processing target defined as a recognition target word, among the first to the nth of the words that form the continuous words.

4. The recording medium for storing programs as set forth in claim 3, further comprising:

a program for inputting a response from the speaker indicating an affirmative/negative response per output candidate;

a program for recognition processing the response; and a program for confirming the output candidate as the recognition target word when the response of the speaker is determined to be affirmative.

5. The recording medium for storing programs as set forth in claim 4, further comprising:

a program for outputting a following candidate when the response of the speaker is determined to be negative; and a program for inputting the response from the speaker indicating an affirmative/negative response with respect to the output candidate;

a program for recognition processing the affirmative/ negative, confirming the output candidate as the recognition target word when the response of the speaker is determined to be affirmative.

6. The recording medium for storing programs as set forth in claim 5, the program for outputting the following candidate and the program for inputting the response, being repeated for the following candidates up to the mth candidate if a negative response is determined.

7. The recording medium for storing programs as set forth in claim 6, further comprising:

a program for outputting a request for the speaker to speak the recognition target word again when the response with respect to the mth candidate is determined to be negative.

* * * * *